United States Patent
Miyazaki

(10) Patent No.: US 10,989,906 B2
(45) Date of Patent: Apr. 27, 2021

(54) MICROSCOPE IMAGING OPTICAL SYSTEM AND LIGHT-FIELD MICROSCOPE INCLUDING THE MICROSCOPE IMAGING OPTICAL SYSTEM

(71) Applicant: OLYMPUS CORPORATION, Hachioji (JP)

(72) Inventor: Kanto Miyazaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 238 days.

(21) Appl. No.: 16/209,691

(22) Filed: Dec. 4, 2018

(65) Prior Publication Data

US 2019/0107704 A1  Apr. 11, 2019

Related U.S. Application Data

(63) Continuation of application No. PCT/JP2016/068441, filed on Jun. 21, 2016.

(51) Int. Cl.
*G02B 21/06* (2006.01)
*G02B 21/36* (2006.01)
(Continued)

(52) U.S. Cl.
CPC ....... *G02B 21/361* (2013.01); *G02B 13/0095* (2013.01); *G02B 13/22* (2013.01);
(Continued)

(58) Field of Classification Search
CPC .. G02B 21/361; G02B 13/0095; G02B 13/22; G02B 21/0016; G02B 21/02;
(Continued)

(56) References Cited

U.S. PATENT DOCUMENTS 5,671,080 A   9/1997  Mihara
5,805,347 A *  9/1998  Mizutani ............... G02B 15/16
                                                    359/663
(Continued)

FOREIGN PATENT DOCUMENTS

JP        3544564 B2     7/1994
JP     H07181380 A       7/1995
(Continued)

OTHER PUBLICATIONS

International Search Report (and English translation thereof) dated Aug. 2, 2016 issued in International Application No. PCT/JP2016/068441.
(Continued)

*Primary Examiner* — Arnel C Lavarias
(74) *Attorney, Agent, or Firm* — Holtz, Holtz & Volek PC

(57) ABSTRACT

A microscope imaging optical system has an entrance pupil on an object side and includes, in order from the object side, a first lens group including a biconvex lens and a negative lens having a concave surface on the object side, a second lens group including a negative lens having a concave surface on the object side, and a third lens group including a meniscus lens and a positive lens having a convex surface on an image side. The microscope imaging optical system satisfies conditional expressions $0.05<dp1/f<0.15$ and $0.5<TT/f<0.9$, where $dp1$ is the spacing between a lens, closest to the object, of the first lens group and the entrance pupil, $f$ is the focal length of the microscope imaging optical system, and $TT$ is the distance from the entrance pupil to the object image plane.

7 Claims, 23 Drawing Sheets

(51) Int. Cl.
*G02B 21/02* (2006.01)
*G02B 27/00* (2006.01)
*G02B 13/22* (2006.01)
*G02B 13/00* (2006.01)
*G02B 21/00* (2006.01)

(52) U.S. Cl.
CPC ......... *G02B 21/0016* (2013.01); *G02B 21/02* (2013.01); *G02B 27/0075* (2013.01)

(58) Field of Classification Search
CPC ........ G02B 27/0075; G02B 9/00; G02B 9/12; G02B 9/14; G02B 9/24; G02B 9/26; G02B 13/001; G02B 13/0015; G02B 21/00; G02B 21/0004
USPC ....... 359/385, 362, 363, 368, 369, 434, 642, 359/656, 661, 663, 784, 754, 785, 786, 359/788, 796, 797
See application file for complete search history.

(56) References Cited

U.S. PATENT DOCUMENTS

| | | | |
|---|---|---|---|
| 5,808,791 A | 9/1998 | Kawano et al. | |
| 6,323,998 B1 | 11/2001 | Kawano et al. | |
| 7,362,511 B2 | 4/2008 | Suzuki et al. | |
| 9,069,182 B2 | 6/2015 | Kawasaki | |
| 9,983,398 B2* | 5/2018 | Furuya | G02B 13/0095 |
| 10,678,032 B2* | 6/2020 | Byler | G02B 21/361 |
| 2004/0246592 A1 | 12/2004 | Suzuki | |
| 2008/0024882 A1* | 1/2008 | Park, II | G02B 13/004 359/793 |
| 2012/0281082 A1 | 11/2012 | Kawasaki | |

FOREIGN PATENT DOCUMENTS

| | | |
|---|---|---|
| JP | 2002267936 A | 9/2002 |
| JP | 2004361778 A | 12/2004 |
| JP | 2008134660 A | 6/2008 |
| JP | 2012234056 A | 11/2012 |

OTHER PUBLICATIONS

Cohen, et al., "Enhancing the performance of the light field microscope using wavefront coding", Optics Express, vol. 22, Issue 20, Oct. 3, 2014, pp. 24817-24839.

* cited by examiner

SPHERICAL ABERRATION (mm)

ASTIGMATISM (mm)

MICROSCOPE IMAGING OPTICAL SYSTEM AND LIGHT-FIELD MICROSCOPE INCLUDING THE MICROSCOPE IMAGING OPTICAL SYSTEM

CROSS-REFERENCE TO RELATED APPLICATIONS

This is a continuation of International Application PCT/JP2016/068441, with an international filing date of Jun. 21, 2016, which is hereby incorporated by reference herein in its entirety.

TECHNICAL FIELD

The present invention relates to a microscope imaging optical system and a light-field microscope apparatus.

BACKGROUND ART

So-called light-field technology, in which information about the orientation of a light beam is acquired together with an image by disposing a lens array on the image plane of a lens, is available. Although this technology has been applied mainly to photographic lenses, application of this technology to microscopes has begun nowadays.

Application of the light-field technology to microscopes makes it possible to acquire three-dimensional information of a minute examination object with a single shot. Although three-dimensional information of a minute examination object can be acquired with, for example, a confocal microscope, it takes a long time until the final three-dimensional information is obtained because a three-dimensional image is formed by repeating processing for each and every cross-sectional image. In contrast, because the use of light-field technology allows three-dimensional information to be obtained in a short time, attention is focused on its application to microscopes nowadays.

In addition, efforts are also being made to enhance the function of microscopes by combining light-field technology and a technology called Coded Aperture (refer to, for example, Noy Cohen, Samuel Yang, Aaron Andalman, Michael Broxton, Logan Grosenick, Karl Deisseroth, Mark Horowitz, and Marc Levoy, "Enhancing the performance of the light field microscope using wavefront coding," Opt. Express" 22, 24817-24839 (2014).).

In this technology, a spatial filter, such as a phase mask having a particular pattern, is disposed at the pupil of an optical system, thereby enhancing the resolution in the lateral direction of three-dimensional information by processing an acquired image signal with a computer.

In order to acquire a light-field image, a microlens array is disposed on the image plane, and behind the microlens array, an imaging element is disposed. Also, the exit pupil of a microscope objective lens is generally imaged on the light-receiving surface of the imaging element via the microlenses. By doing so, which pixel of the imaging element a light beam is incident upon is determined by the orientation of the light beam incident upon the objective lens, and thereby information about the directions of light rays can be obtained.

As shown in FIGS. 5A and 5B, there are normally n×m pixels corresponding to each microlens, and an image of the pupil is formed in that region. To establish such a relationship over the entire screen, the light ray passing through the center of the exit pupil of the objective lens, i.e., the chief ray, needs to be parallel to the optical axis. In other words, image-side telecentricity needs to be achieved.

Many high-grade microscopes employ a so-called infinity-correction optical system, in which a light ray from the object image exiting the objective lens is collimated light. The light ray collimated by the objective lens enters an image-forming lens, and an image of the object is formed at the back focus of the image-forming lens.

In addition, when the above-described Coded Aperture technology is to be applied, a phase filter or the like is disposed at the pupil, and hence it is necessary to employ an optical arrangement in which the exit pupil of the objective lens, which is normally present in the interior of the lens, is temporarily imaged in free space.

More specifically, the following configuration, in order from the object side, is employed.
(1) Objective lens
(2) Relay optical system for imaging the exit pupil of the objective lens
(3) Image-forming lens There is a known optical system in which the exit pupil of an objective lens is imaged in free space, and a filter, such as a pupil modulation element, can be placed there (refer to, for example, Publication of Japanese Patent No. 3544564 and Japanese Unexamined Patent Application, Publication No. 2012-234056).

SUMMARY OF INVENTION

One aspect of the present invention is a microscope imaging optical system having an entrance pupil on an object side, the microscope imaging optical system including, in order from the object side: a first lens group that has positive refractive power and that includes a biconvex lens and a negative lens having a concave surface on the object side; a second lens group that has negative refracting power and that includes a negative lens having a concave surface on the object side; and a third lens group that has positive refractive power and that includes a meniscus lens and a positive lens having a convex surface on the image side, wherein the microscope imaging optical system satisfies conditional expressions (1) and (2)

$$0.05 < dp1/f < 0.15 \quad (1) \text{ and}$$

$$0.5 < TT/f < 0.9 \quad (2),$$

where $dp1$ is a spacing between the lens that belongs to the first lens group and that is closest to the object side and the entrance pupil, f is a focal length of the microscope imaging optical system, and TT is a distance from the entrance pupil to an object image plane formed by the microscope imaging optical system.

DESCRIPTION OF EMBODIMENTS

A microscope imaging optical system 4 and a light-field microscope apparatus 1 according to one embodiment of the present invention will now be described with reference to the drawings.

Figure 1:
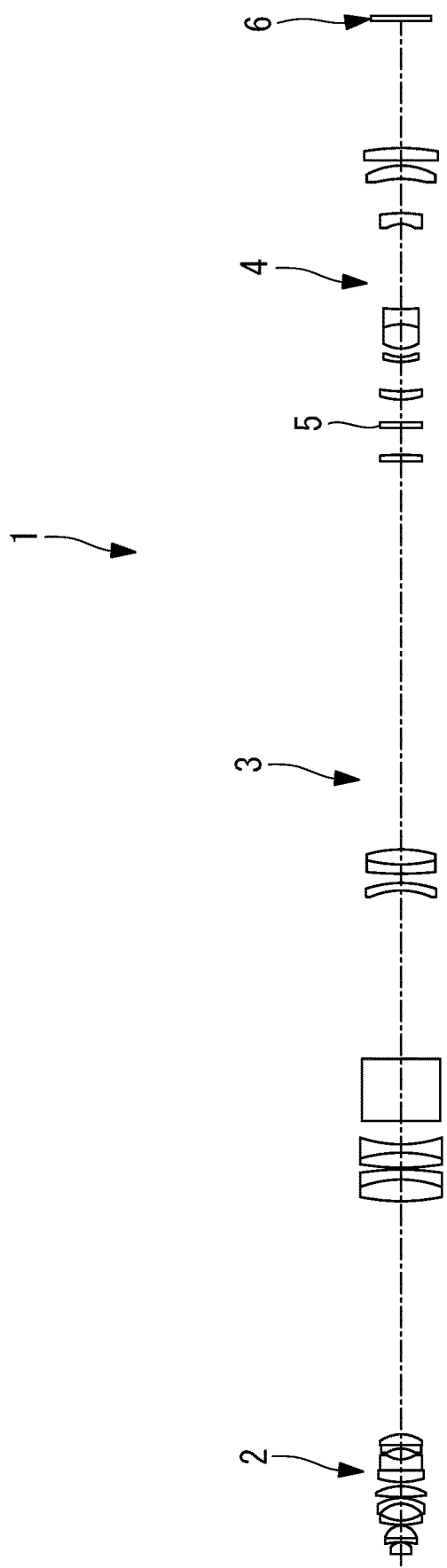
FIG. 1 is a longitudinal sectional view showing the lens arrangement of a light-field microscope apparatus according to one embodiment of the present invention.

As shown in FIG. 1, the light-field microscope apparatus 1 according to this embodiment includes: an infinity-correction-type objective lens 2 for collecting light from a subject; a pupil relay optical system 3 for re-forming the exit pupil of this objective lens 2 at an optically conjugate position; the microscope imaging optical system 4 according to this embodiment for forming an image of the light beam relayed by the pupil relay optical system 3; a pupil modulation optical element 5 disposed at the position of the exit pupil re-formed by the pupil relay optical system 3; and a microlens array 6 disposed at the image forming position by means of the microscope imaging optical system 4.

The objective lens 2 collects a light beam from a specimen (object) placed on, for example, the sample stage of the microscope and forms a virtual image at infinity. The light beam that comes from the object and that has passed through the objective lens 2 is incident on the pupil relay optical system 3 in the form of a collimated beam.

The pupil relay optical system 3, having a substantially infinite focal length, focuses the collimated beam that is incident thereon from the objective lens 2, temporarily forms an object image in the interior of the pupil relay optical system 3, and then emits the object image in the form of a collimated beam, thus forming a virtual image of the object at infinity.

The microscope imaging optical system 4 according to this embodiment is disposed behind the pupil relay optical system 3 and focuses the collimated beam emitted from the pupil relay optical system 3, thereby forming an object image.

Figure 2:
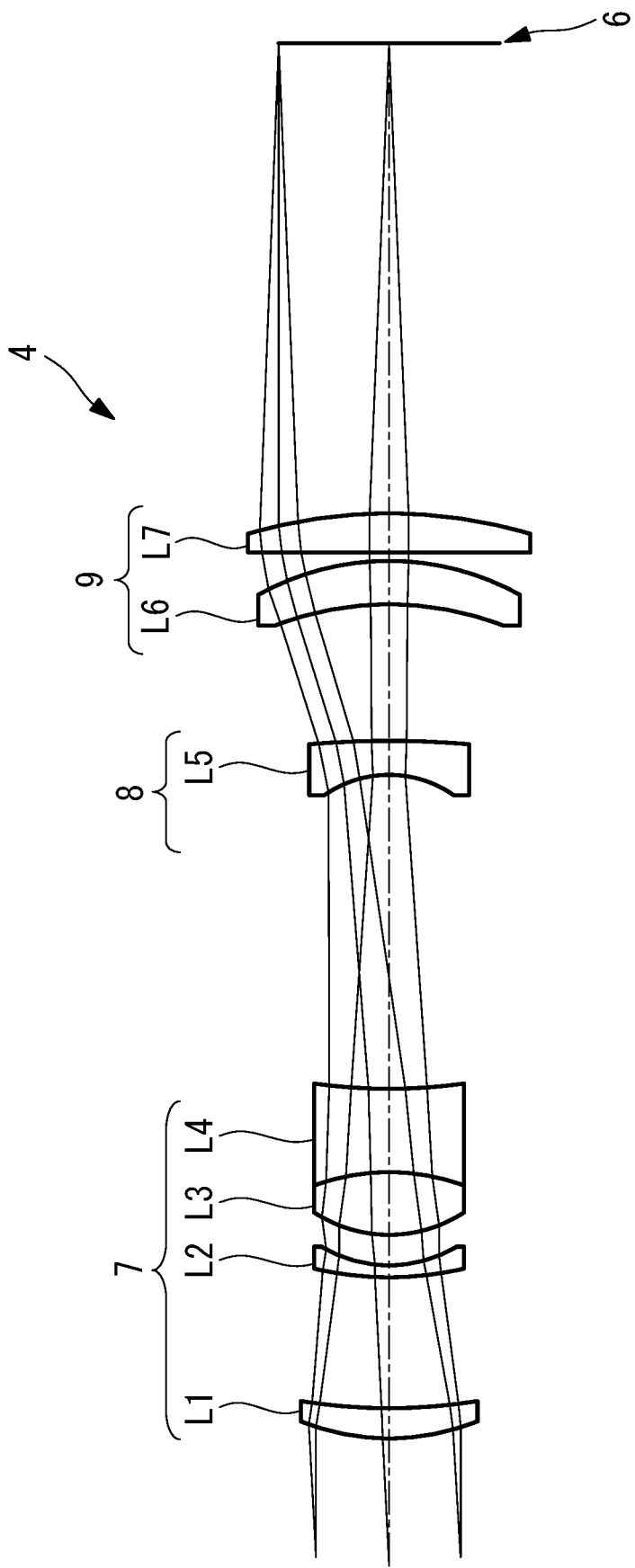
FIG. 2 is a longitudinal sectional view showing example 1 of a microscope imaging optical system, according to one embodiment of the present invention, provided in the light-field microscope apparatus in FIG. 1.

As shown in FIG. 2, the microscope imaging optical system 4 has an entrance pupil on the object side and includes a first lens group 7, a second lens group 8, and a third lens group 9 in that order from the object side.

The first lens group 7 has positive refractive power and includes at least one biconvex lens L3 and at least one negative lens L4 that has a concave surface on the object side.

More specifically, the first lens group 7 includes two meniscus lenses L1 and L2 that have convex surfaces on the object side and a compound lens composed of the biconvex lens L3 and the biconcave lens L4, in that order from the object side.

The second lens group 8 has negative refracting power and includes at least one negative lens L5 that has a concave surface on the object side.

More specifically, the second lens group 8 is a single meniscus lens L5 that has a concave surface on the object side.

The third lens group 9 has positive refractive power and includes at least one meniscus lens L6 and a positive lens L7 that has a convex surface on the image side.

More specifically, the third lens group 9 includes the meniscus lens L6 that has a concave surface on the object side and the planoconvex lens L7 that has a convex surface on the image side, in that order from the object side.

Also, the microscope imaging optical system 4 according to this embodiment satisfies conditional expressions (1) to (7) below.

$$0.05 < dp1/f < 0.15 \quad (1)$$

$$0.5 < TT/f < 0.9 \quad (2)$$

$$0.2 < fG3/f < 0.5 \quad (3)$$

$$0.5 < fG1 < 0.8 \quad (4)$$

$$-0.4 < fG2 < -0.1 \quad (5)$$

$$vd1cx - vd1cv > 50 \quad (6)$$

$$vd3p - vd3m > 33 \quad (7)$$

Here, dp1 is the spacing between the lens L1, which is closest to the object, of the first lens group 7 and the entrance pupil, f is the focal length of the microscope imaging optical system 4, and TT is the distance from the entrance pupil to the object image plane formed by the microscope imaging optical system 4.

In addition, fG1 is the focal length of the first lens group 7, fG2 is the focal length of the second lens group 8, and fG3 is the focal length of the third lens group 9.

In addition, vd1cx is the Abbe number of the biconvex lens L3 of the first lens group 7, and vd1cv is the Abbe number of the negative lens L4 of the first lens group 7.

In addition, vd3p is the Abbe number of the positive lens L7 of the third lens group 9, and vd3m is the Abbe number of the meniscus lens L6 of the third lens group 9.

The pupil modulation optical element 5 is, for example, a spatial filter for a Coded Aperture and is disposed on the image plane of the exit pupil.

In addition, the light-field microscope apparatus 1 according to this embodiment satisfies conditional expression (8) below.

$$0 < \theta < |0.4NA/(\beta \cdot n)| \quad (8)$$

Here, β is the imaging magnification of the object image formed on the microlens array 6, NA is the numerical aperture of the objective lens 2, n is the square root of the number of pixels included in one picture element, and θ is the tilting of the chief ray exiting the microscope imaging optical system 4 relative to the optical axis.

The microscope imaging optical system 4 according to this embodiment with the above-described structure affords an advantage in that the entire optical system can be configured to be compact by reducing the distance from the entrance pupil to the image plane as a result of conditional expression (1) and conditional expression (2) being satisfied.

If the lower limit of conditional expression (1) is exceeded, the pupil modulation optical element 5 disposed on the entrance pupil plane is too close to the first lens group 7, making disposition thereof difficult. In contrast, if the upper limit of conditional expression (1) is exceeded, the distance from the entrance pupil to the first lens group 7 is large, resulting in too large a distance from the entrance pupil to the image plane. In addition, if the upper limit of conditional expression (2) is exceeded, the distance from the entrance pupil to the image plane is large, resulting in an increase in the size of the entire optical system.

In addition, according to the microscope imaging optical system 4 of this embodiment, not only can the spherical aberration, comatic aberration, and distortion of the object image be made favorable but also the image-side telecentricity can be maintained as a result of conditional expression (3) being satisfied.

If the lower limit of conditional expression (3) is exceeded, the refractive power of the third lens group 9 is too high, deteriorating the spherical aberration, comatic aberration, and distortion of the object image. On the other hand, if the upper limit of conditional expression (3) is exceeded, the refractive power of the third lens group 9 becomes low and the power for deflecting a light ray is insufficient, making it impossible to properly maintain the image-side telecentricity.

In addition, according to the microscope imaging optical system 4 of this embodiment, not only can the spherical aberration and comatic aberration of the object image be made favorable but also a specified focal length can be achieved as a result of conditional expression (4) being satisfied. In addition, not only can the field curvature be properly corrected but also the spherical aberration and comatic aberration of the object image can be made favorable as a result of conditional expression (5) being satisfied.

If the lower limit of conditional expression (4) is exceeded, the refractive power of the first lens group 7 is too high, deteriorating the spherical aberration and comatic aberration of the object image. If the upper limit of conditional expression (4) is exceeded, the refractive power is too low, making it impossible to achieve a specified focal length.

In addition, if the lower limit of conditional expression (5) is exceeded, the refractive power of the second lens group 8 is too low and the Petzval sum becomes large, making it impossible to correct field curvature. If the upper limit of conditional expression (5) is exceeded, the refractive power is too high, deteriorating the spherical aberration and comatic aberration of the object image.

In addition, according to the microscope imaging optical system 4 of this embodiment, the axial chromatic aberration and chromatic aberration of magnification of the object image can be made favorable as a result of conditional expression (6) being satisfied, thereby making it possible to enhance the imaging performance.

In addition, the image-side telecentricity at wavelengths other than the dominant wavelength can be maintained properly as a result of conditional expression (7) being satisfied.

If the range of conditional expression (6) is not satisfied, the axial chromatic aberration and the chromatic aberration of magnification of the object image deteriorate, deteriorating the imaging performance.

In addition, if the range of conditional expression (7) is not satisfied, the image-side telecentricity at wavelengths other than the dominant wavelength deteriorates, causing a shift due to color of the pupil image formed by a microlens 10.

Here, how precisely image-side telecentricity can be obtained, in other words, the required parallelism of the chief ray relative to the optical axis, in an optical system using light-field technology will be described.

As described above, an image of the exit pupil is formed on the imaging element 11 by the microlenses 10 disposed on the object image plane. If this image of the exit pupil shifts from an intended pixel region, the problem described below occurs.

A shift of the pupil image on the imaging element 11 is represented by the tilting (rad) of the chief ray×the focal length of a microlens 10.

In a case where the image of the exit pupil formed by a microlens 10 is inscribed in the corresponding n-pixel×n-pixel region, even a slight shift of the image of the pupil causes light to enter a neighboring picture element. This produces crosstalk between picture elements and is detrimental in that it decreases the resolution in the horizontal and vertical directions.

Here, the relationship of the characteristics of the objective lens 2, microscope imaging optical system 4, microlens 10, and imaging element 11, as well as the relationship of the permissible angle of a shift from telecentric nature, will be described.

When β is the imaging magnification of the object image formed on the microlens array 6, NA is the numerical aperture of the objective lens 2, f is the focal length of the microlens 10, p is the pitch of the imaging element 11, $n^2$ is the number of pixels included in one picture element, n×p is the pitch of the microlens array 6, k×p (k is a coefficient) is the permissible amount of shift of the center of the pupil image on the imaging element surface, and θ is permissible tilting of the chief ray, a pupil image having a diameter identical to the pitch of the microlens 10 is formed on the imaging element 11, with a focal length f determined as shown below.

$$f = p \cdot n \cdot \beta/(2NA)$$

A permissible amount Δ, indicating how much this image of the pupil formed on the imaging element 11 is permitted to shift directly from below the microlens 10, is represented as follows using a coefficient k.

$$\Delta = k \cdot p$$

Here, if 0<k<0.2 (i.e., a shift by up to ⅕ of the pixel pitch is permissible), the permissible amount of tilting of the chief ray is $$0 < \theta < |0.4NA/(\beta \cdot n)|$$

from θ=f/(k·p),
thus deriving conditional expression (8).

Therefore, the light-field microscope apparatus 1 according to this embodiment satisfies conditional expression (8) and thus has sufficient performance for use as a light-field optical system by suppressing, within the permissible range, the shift angle θ of tilting of the chief ray relative to the optical axis.

Note that although this embodiment has been described by way of an example where all of conditional expression (1) to conditional expression (8) are satisfied, it is not necessary to satisfy conditional expression (3) to conditional expression (8), and it is also acceptable that at least one conditional expression is satisfied.

EXAMPLE 1

Example 1 of the microscope imaging optical system 4 according to this embodiment will be described below with reference to the drawings.

Figure 3:
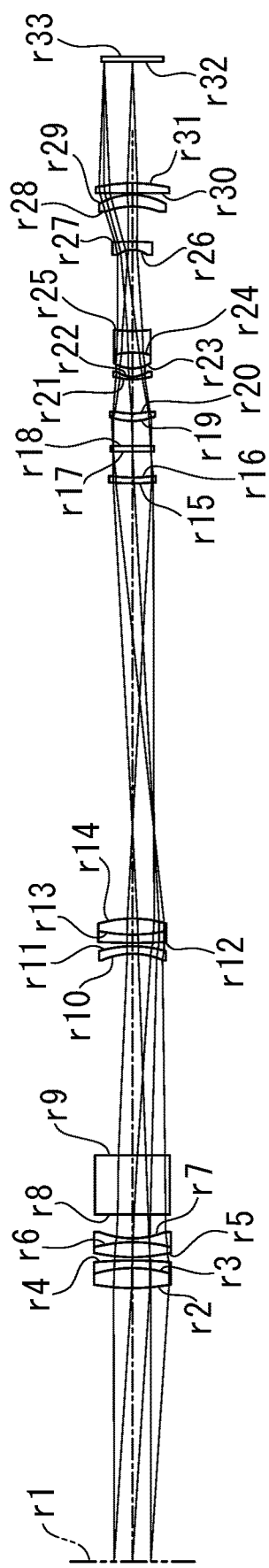
FIG. 3 is a longitudinal sectional view showing the arrangement of the microscope imaging optical system in FIG. 2, a pupil relay optical system, a pupil modulation optical element, and a microlens array.

FIG. 3 is a diagram depicting the arrangement of the pupil relay optical system 3, pupil modulation optical element 5, microscope imaging optical system 4, and microlens array 6 according to this example.

Lens data of the optical system in FIG. 3 is shown below.

Figure 4A:
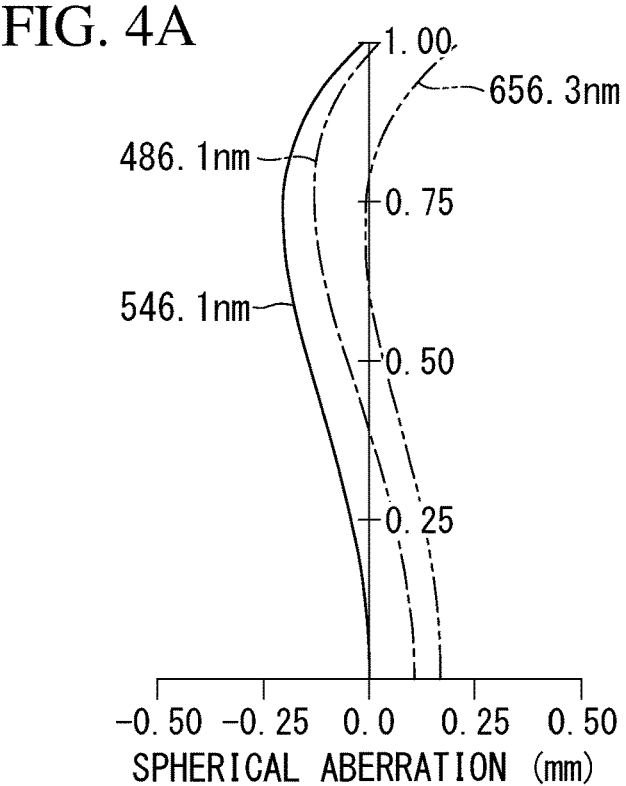
FIG. 4A is a diagram depicting spherical aberration of an object image with the optical system in FIG. 3.
Figure 4B:
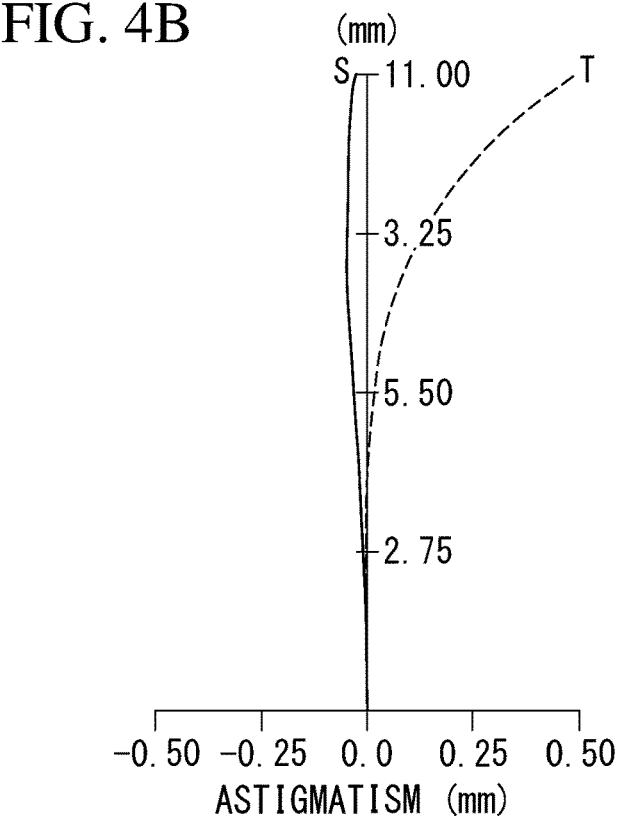
FIG. 4B is a diagram depicting astigmatism of an object image with the optical system in FIG. 3.
Figure 4C:
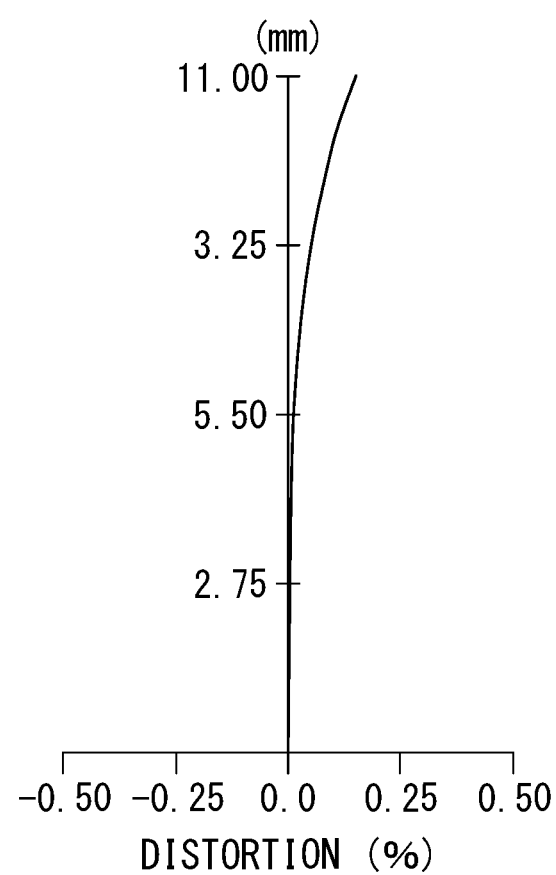
FIG. 4C is a diagram depicting distortion of an object image with the optical system in FIG. 3.

In addition, FIGS. 4A, 4B, and 4C show aberrations of the microscope imaging optical system 4 including the pupil relay optical system 3.

Here, the dominant wavelength is 546.07 nm, and the entrance pupil diameter is 13.5 mm.

| Surface No. | Radius of curvature r | Spacing d | nd | vd |
| --- | --- | --- | --- | --- |
| 1 | ∞ | 107.0000 | | |
| 2 | 70.2797 | 8.2500 | 1.48749 | 70.24 |
| 3 | −46.3398 | 3.0129 | 1.80100 | 34.97 |
| 4 | −133.0073 | 1.0398 | | |
| 5 | 62.4945 | 6.0000 | 1.80100 | 34.97 |
| 6 | −62.6703 | 1.5000 | 1.65412 | 39.68 |
| 7 | 38.1588 | 9.3728 | | |
| 8 | ∞ | 23.000 | 1.51633 | 64.14 |
| 9 | ∞ | 79.1300 | | |
| 10 | −29.1265 | 3.0000 | 1.51633 | 64.14 |
| 11 | −37.7186 | 1.0000 | | |

-continued

| Surface No. | Radius of curvature r | Spacing d | nd | vd |
| --- | --- | --- | --- | --- |
| 12 | 162.5227 | 3.0000 | 1.63980 | 34.47 |
| 13 | 48.6267 | 6.5000 | 1.51633 | 64.14 |
| 14 | −50.9241 | 170.1219 | | |
| 15 | 51.3286 | 2.6000 | 1.49700 | 81.55 |
| 16 | 215.1066 | 10.0000 | | |
| 17 | ∞ | 2.0000 | 1.51633 | 64.14 |
| 18 | ∞ | 10.0000 | | |
| 19 | 24.2804 | 3.0115 | 1.78472 | 25.68 |
| 20 | 47.9341 | 13.2756 | | |
| 21 | 28.3335 | 1.0272 | 1.63980 | 34.47 |
| 22 | 12.7677 | 3.1345 | | |
| 23 | 13.1581 | 6.4123 | 1.49700 | 81.55 |
| 24 | −20.3492 | 8.3922 | 1.78472 | 25.68 |
| 25 | 61.2789 | 31.4873 | | |
| 26 | −12.1210 | 3.4473 | 1.63980 | 34.47 |
| 27 | −96.9333 | 13.7561 | | |
| 28 | −33.2466 | 4.4938 | 1.78472 | 25.68 |
| 29 | −25.3688 | 0.6925 | | |
| 30 | 9634.5724 | 3.9960 | 1.78472 | 25.68 |
| 31 | −48.5903 | 47.3463 | | |
| 32 | 0.9202 | 1.0000 | 1.458 | 67.7 |
| 33 | ∞ | 1.4522 | | |
| 34 | ∞ | | | |

Surface No. 1 is the exit pupil of the objective lens 2, surface No. 2 to surface No. 16 are the pupil relay optical system 3, the focal length is substantially infinite, and the imaging magnification of the pupil is ×1.

The exit pupil of the objective lens 2 is formed by the pupil relay optical system 3 at the position of surface No. 18. In addition, surface No. 18 is also the position of the entrance pupil of the microscope imaging optical system 4.

Surface No. 17 and surface No. 18 are the pupil modulation optical element 5.

Surface No. 19 to surface No. 31 are the microscope imaging optical system 4 according to this embodiment, and the focal length f is 180 mm. The image height is 11 mm.

Figure 5A:
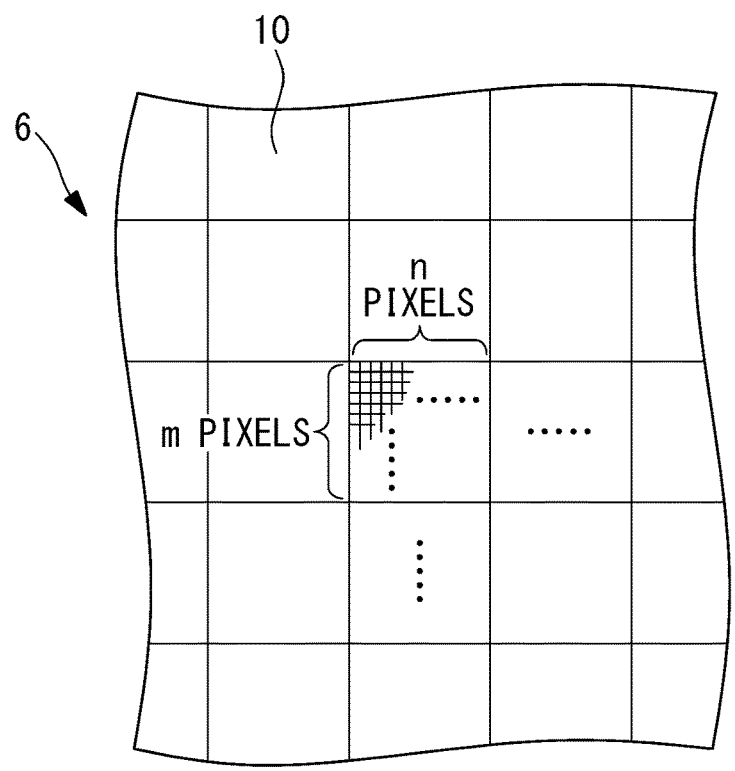
FIG. 5A is a front elevational view showing the relationship between the microlens array and pixels of a monochrome imaging element.
Figure 5B:
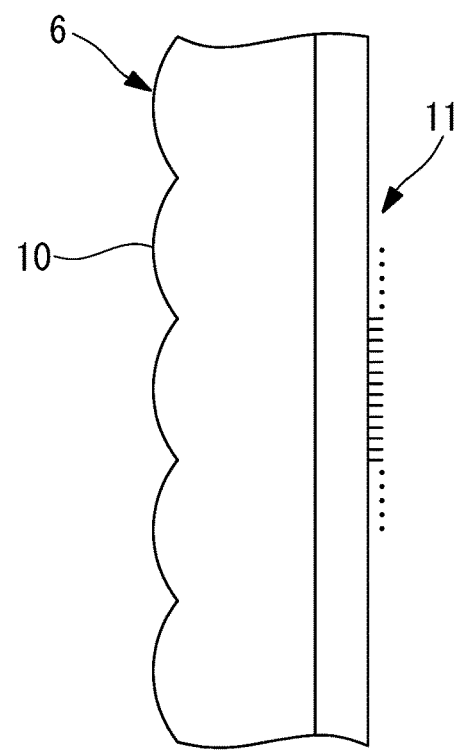
FIG. 5B is a longitudinal sectional view of FIG. 5A.

Surface No. 32 and surface No. 33 are the microlens array 6 shown in FIGS. 5A and 5B.

The pitch of the microlens array 6 is 0.075 mm both in the longitudinal and lateral directions, and the size on a plane orthogonal to the optical axis is 17.6 mm×13.2 mm.

Surface No. 34 is the light-receiving surface of the imaging element 11. The pixel pitch of the imaging element 11 is 5 μm. More specifically, pixels in the number of 15 pixel×15 pixel=225 (n=15) correspond to each of the microlenses 10.

The focal length of each of the microlenses 10 of microlens array 6 is 2 mm.

As shown in FIG. 2, the first lens group 7 of the microscope imaging optical system 4 according to this embodiment includes the positive meniscus lens L1 that has a convex surface on the object side, the negative meniscus lens L2 that has a convex surface on the object side, and a compound lens composed of the biconvex lens L3 and the biconcave lens L4. The Abbe number of the biconvex lens L3 is 81.55, and the Abbe number of the biconcave lens L4 is 25.68.

The second lens group 8 is the meniscus lens L5 that has a concave surface on the object side.

The third lens group 9 is the positive meniscus lens L6 that has a convex surface on the image side and the planconvex lens L7. The radius of curvature of the concave surface of the meniscus lens L6 is 33.2466.

The spacing dp1 between the meniscus lens L1, closest to the object, of the first lens group 7 and the entrance pupil is $dp1=d17+d18=12$ mm, and therefore, $dp1/f=0.067$.

Thus, conditional expression (1) is satisfied.

In addition, the distance TT from the entrance pupil to the object image plane formed by the microscope imaging optical system 4 is $TT=152.47$ mm, and therefore, $TT/f=0.847$.

Thus, conditional expression (2) is satisfied.

In addition, the focal length fG1 of the first lens group 7, the focal length fG2 of the second lens group 8, and the focal length fG3 of the third lens group are $fG1=106.23$ mm, $fG2=-21.85$ mm, and $fG3=38.2$ mm, respectively, and therefore, $fG1/f=0.59$, $fG2/f=-0.12$, and $fG3/f=0.21$.

Thus, conditional expressions (3), (4), and (5) are satisfied.

In addition, from the Abbe number vd1cx of the biconvex lens L3 of the first lens group 7 and the Abbe number vd1cv of the meniscus lens L4 of the first lens group 7, $vd1cx-vd1cv=56.22$.

Thus, conditional expression (6) is satisfied.

Next, conditional expression (8) for telecentricity will be calculated. A permissible shift θ of tilting of the chief ray relative to the optical axis in this embodiment is $0.4NA/(\beta \cdot n)=3.4$ arcminute from conditional expression (8).

Here, the numerical aperture of the objective lens 2, NA=0.75, and the imaging magnification of the object image, β=20.

Figure 6:
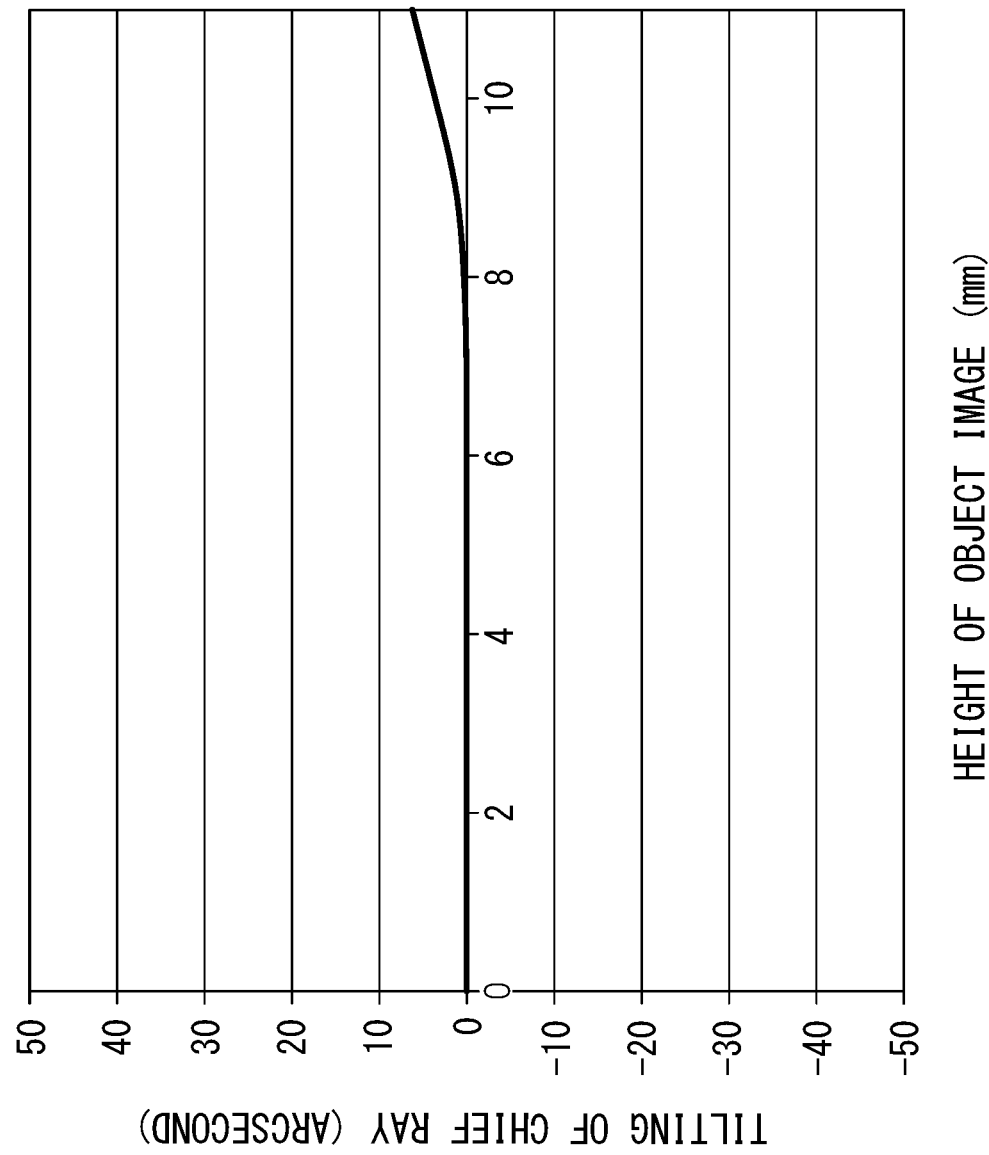
FIG. 6 is a diagram depicting the relationship of tilting of a chief ray with the height of the object image in the microscope imaging optical system in FIG. 2.

FIG. 6 shows tilting of the chief ray depending on the image height.

Because the angle shift of the chief ray relative to the optical axis is within 6.2 arcsecond over the entire image height and conditional expression (8) is satisfied, the light-field microscope apparatus 1 has sufficient performance for use as a light-field optical system.

In this example, the distance from the conjugate point of the exit pupil of the objective lens 2, i.e., the entrance pupil of the microscope imaging optical system 4, to the object image plane is 152.47 mm. Because the focal length of the microscope imaging optical system 4 is 180 mm, the length from the entrance pupil to the object image plane is about 0.85-times the focal length and is thus very short compared with a conventional example where this length is 1.63 to 2-times the focal length.

Note that the image-forming lens can be disposed behind the objective lens 2 by omitting the pupil relay optical system 3. If this is the case, image-side telecentricity can be achieved by making the exit pupil of the objective lens 2 coincide with the entrance pupil of the image-forming lens.

EXAMPLE 2

Example 2 of a microscope imaging optical system 12 according to this embodiment will be described below with reference to the drawings.

Figure 7:
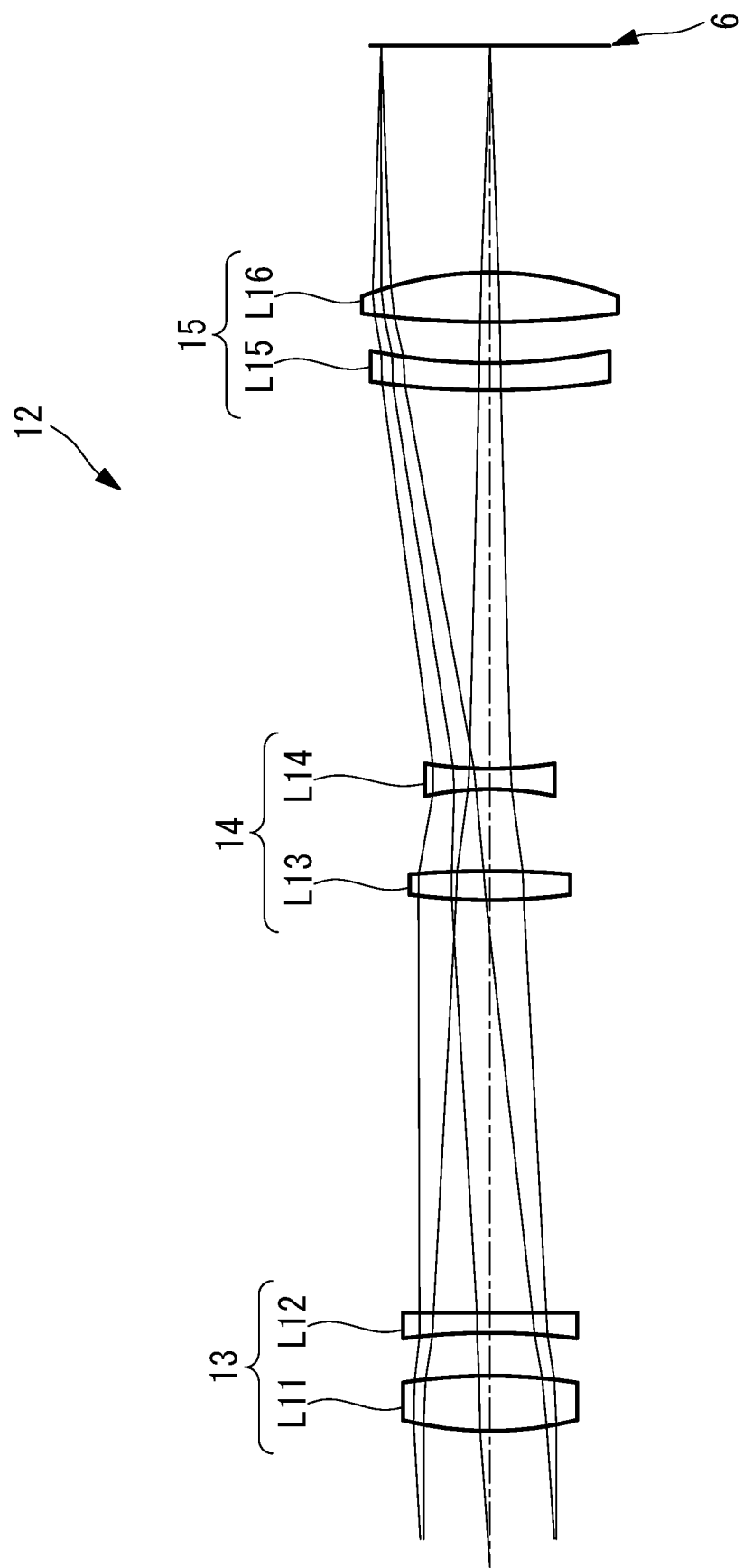
FIG. 7 is a longitudinal sectional view showing example 2 of the microscope imaging optical system provided in the light-field microscope apparatus in FIG. 1.
Figure 8:
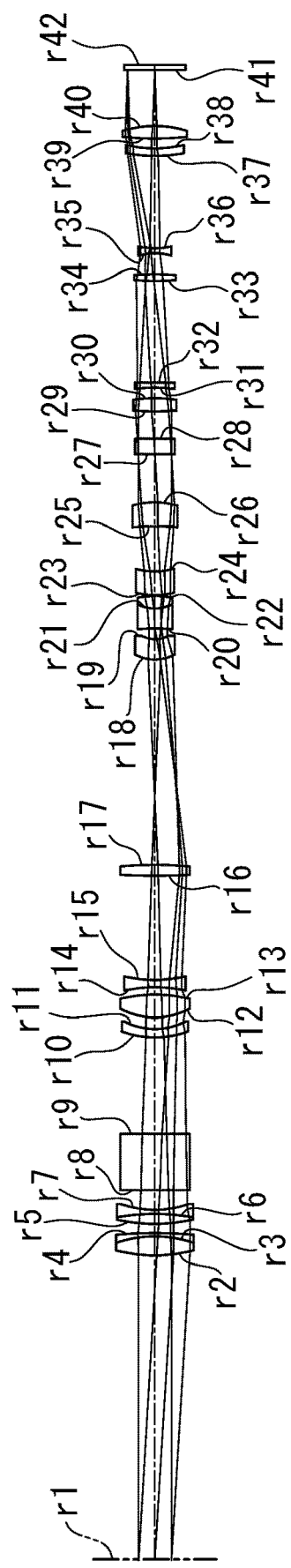
FIG. 8 is a longitudinal sectional view showing the arrangement of the microscope imaging optical system in FIG. 7, the pupil relay optical system, the pupil modulation optical element, and the microlens array.

FIG. 7 is a diagram depicting the lens arrangement of the microscope imaging optical system 12 in this example. FIG. 8 shows the arrangement of the pupil relay optical system 3, the pupil modulation optical element 5, the microscope imaging optical system 12, and the microlens array 6.

Lens data of the optical system in FIG. 8 is shown below.

Figure 9A:
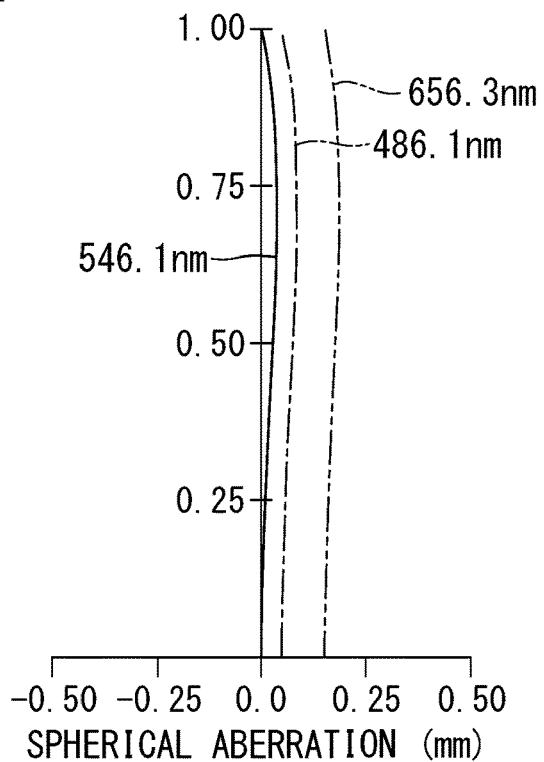
FIG. 9A is a diagram depicting spherical aberration of an object image with the optical system in FIG. 8.
Figure 9B:
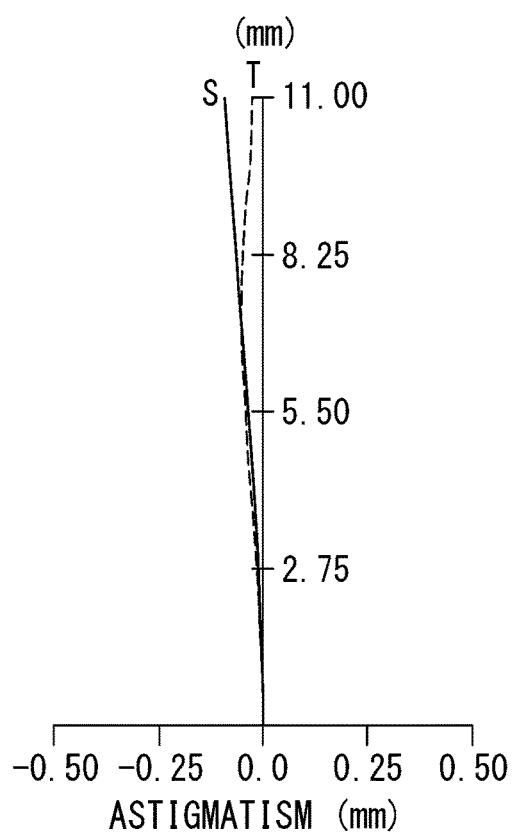
FIG. 9B is a diagram depicting astigmatism of an object image with the optical system in FIG. 8.
Figure 9C:
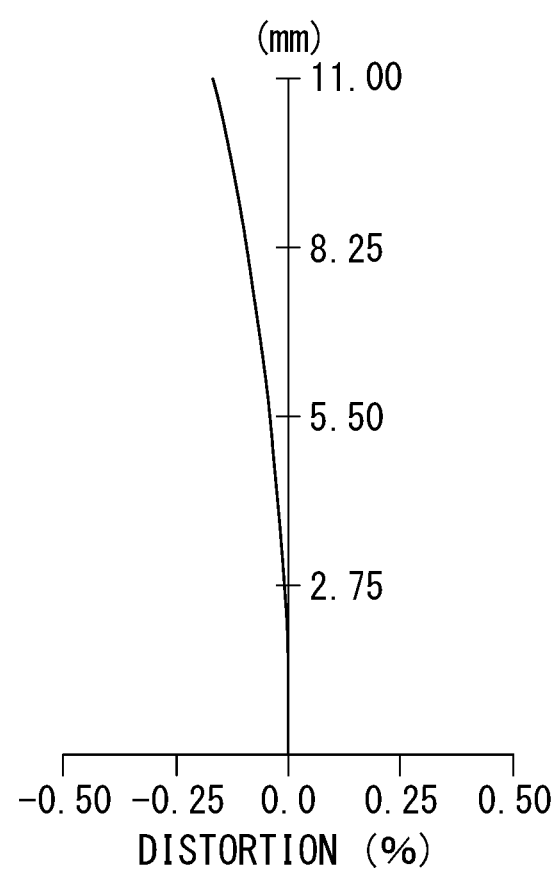
FIG. 9C is a diagram depicting distortion of an object image with the optical system in FIG. 8.

In addition, FIGS. 9A, 9B, and 9C show aberrations of the microscope imaging optical system 12 including the pupil relay optical system 3.

Here, the dominant wavelength is 546.07 nm, and the entrance pupil diameter is 13.5 mm.

| Surface No. | Radius of curvature r | Spacing d | nd | vd |
|---|---|---|---|---|
| 1 | ∞ | 125.7700 | | |
| 2 | 61.7717 | 8.0000 | 1.48749 | 70.24 |
| 3 | −46.7738 | 1.2000 | 1.80100 | 34.97 |
| 4 | −139.3052 | 3.6367 | | |
| 5 | 66.2221 | 4.4630 | 1.80100 | 34.97 |
| 6 | −66.2221 | 1.2000 | 1.64450 | 40.82 |
| 7 | 38.0108 | 8.7000 | | |
| 8 | ∞ | 23.0000 | 1.51633 | 64.14 |
| 9 | ∞ | 40.0000 | | |
| 10 | 41.0478 | 3.0000 | 1.68893 | 31.08 |
| 11 | 23.9637 | 4.9800 | | |
| 12 | 27.9811 | 9.0000 | 1.49700 | 81.55 |
| 13 | −48.3897 | 3.4400 | | |
| 14 | −59.7355 | 3.0000 | 1.68893 | 31.08 |
| 15 | 59.7355 | 42.7700 | | |
| 16 | 178.9415 | 4.5000 | 1.80518 | 25.43 |
| 17 | −100.5222 | 84.4200 | | |
| 18 | 15.7517 | 8.8000 | 1.68893 | 31.08 |
| 19 | 12.2838 | 4.5400 | | |
| 20 | −23.8413 | 7.9000 | 1.80518 | 25.43 |
| 21 | 16.8959 | 5.2400 | 1.49700 | 81.55 |
| 22 | −27.3464 | 0.2200 | | |
| 23 | 22.8104 | 10.0000 | 1.49700 | 81.55 |
| 24 | 39.6290 | 18.1800 | | |
| 25 | −110.4627 | 10.0000 | 1.80518 | 25.43 |
| 26 | −38.4406 | 20.0000 | | |
| 27 | ∞ | 6.2500 | 1.56384 | 60.67 |
| 28 | ∞ | 11.0000 | | |
| 29 | 35.0232 | 5.5000 | 1.49700 | 81.55 |
| 30 | −64.8748 | 4.5000 | | |
| 31 | −50.5176 | 2.0000 | 1.80100 | 34.97 |
| 32 | ∞ | 41.9890 | | |
| 33 | 62.6438 | 3.0000 | 1.80518 | 25.43 |
| 34 | −77.4269 | 8.3202 | | |
| 35 | −26.9630 | 2.0000 | 1.80100 | 34.97 |
| 36 | 40.7950 | 38.5908 | | |
| 37 | 88.3639 | 2.8000 | 1.80518 | 25.43 |
| 38 | 57.3177 | 4.3000 | | |
| 39 | 121.5478 | 5.0000 | 1.49700 | 81.55 |
| 40 | −35.0232 | 22.9000 | | |
| 41 | 0.5502 | 0.8000 | 1.458 | 67.7 |
| 42 | ∞ | 0.6515 | | |
| 43 | ∞ | | | |

Surface No. 1 is the exit pupil of the objective lens 2, surface No. 2 to surface No. 26 are the pupil relay optical system 3, the focal length is substantially infinite, and the imaging magnification of the pupil is ×1.

The pupil of the objective lens 2 is formed by the pupil relay optical system 3 at the position of surface No. 27. In addition, surface No. 27 is also the position of the entrance pupil of the microscope imaging optical system 4 according to this embodiment.

Surface No. 27 and surface No. 28 are the pupil modulation optical element 5.

Surface No. 29 to surface No. 40 are the microscope imaging optical system 12 according to this embodiment, and the focal length is 180 mm. The image height is 11 mm.

Surface No. 41 and surface No. 42 are the microlens array 6.

The pitch of the microlens array 6 is 0.045 mm both in the longitudinal and lateral directions, and the size on a plane orthogonal to the optical axis is 17.6 mm×13.2 mm.

Surface No. 43 is the light-receiving surface of the imaging element 11. The pixel pitch of the imaging element 11 is 5 μm. More specifically, pixels in the number of 9 pixel×9 pixel=81 (n=9) correspond to each of the microlenses 10.

The focal length of each of the microlenses 10 of microlens array 6 is 1.2 mm.

Figure 10A:
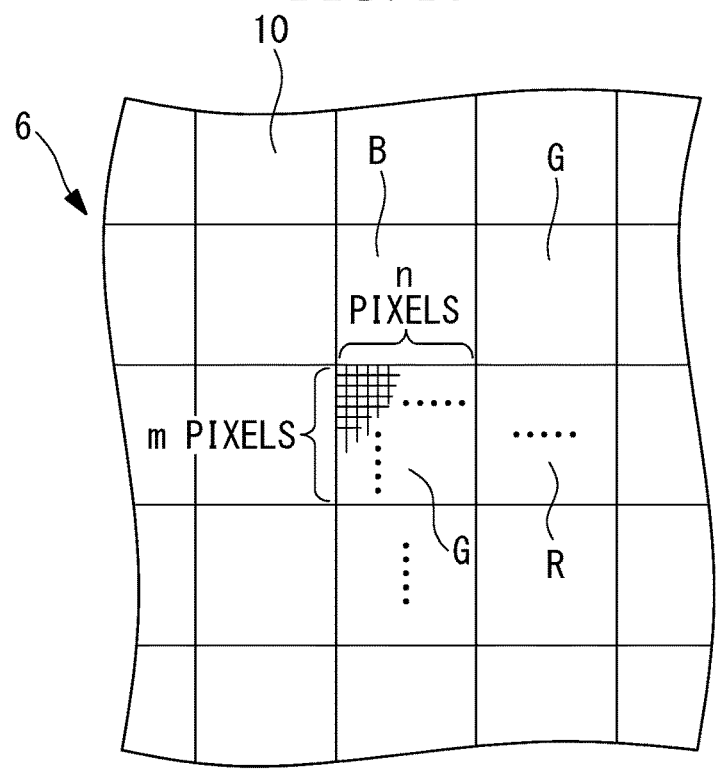
FIG. 10A is a front elevational view showing the relationship between the microlens array and pixels of a color imaging element.
Figure 10B:
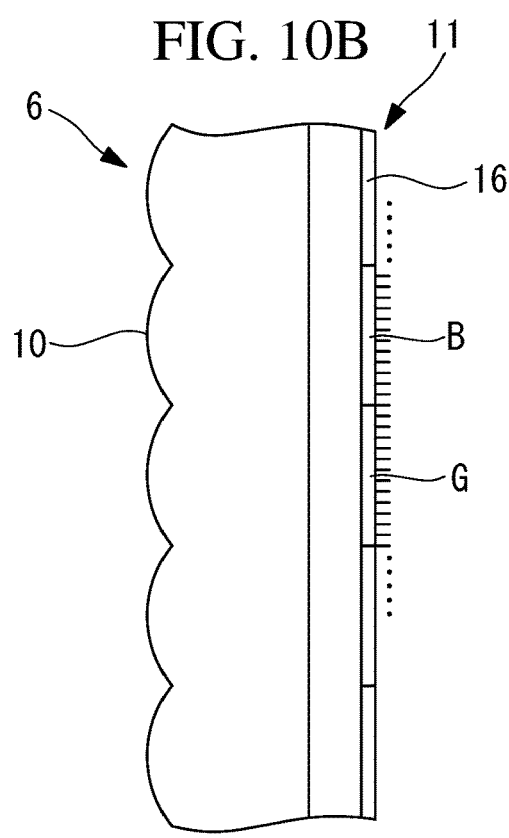
FIG. 10B is a longitudinal sectional view of FIG. 10A.

As shown in FIGS. 10A and 10B, for 9×9 pixels corresponding to each of the microlenses 10, a color filter 16 of any one of R, G, and B is disposed on the imaging element 11. By doing so, a light field color image can be acquired.

A first lens group 13 of the microscope imaging optical system 12 according to this embodiment includes a biconvex lens L11 and a meniscus lens (negative lens) L12 that has a concave surface on the object side, in that order from the object side.

A second lens group 14 includes a biconvex lens L13 and a biconcave lens L14, in that order from the object side.

In addition, a third lens group 15 includes a negative meniscus lens L15 that has a concave surface on the image side and a biconvex lens L16, in that order from the object side.

The radius of curvature of the concave surface of the meniscus lens L15 is 57.3177. The Abbe number of the meniscus lens L15 is 25.33, and the Abbe number of the biconvex lens L16 is 81.55.

The spacing dp1 between the biconvex lens L11, closest to the object, of the first lens group 13 and the entrance pupil is $$dp1=d27+d28=17.25 \text{ mm},$$

and therefore, $$dp1/f=0.096.$$

Thus, conditional expression (1) is satisfied.

In addition, the distance TT from the entrance pupil to the object image plane formed by the microscope imaging optical system 12 is $$TT=158.15 \text{ mm},$$

and therefore, $$TT/f=0.879.$$

Thus, conditional expression (2) is satisfied.

In addition, the focal length fG1 of the first lens group 13, the focal length fG2 of the second lens group 14, and the focal length fG3 of the third lens group 15 are $$fG1=126.10 \text{ mm},$$

$$fG2=-63.43 \text{ mm, and}$$

$$fG3=72.99 \text{ mm, respectively,}$$

and therefore, $$fG1/f=0.70,$$

$$fG2/f=-0.35, \text{ and}$$

$$fG3/f=0.41.$$

Thus, conditional expressions (3), (4), and (5) are satisfied.

In addition, from the Abbe number vd1cx of the biconvex lens L11 of the first lens group 13 and the Abbe number vd1cv of the meniscus lens L12 of the first lens group 13, $$vd1cx-vd1cv=56.22.$$

Thus, conditional expression (6) is satisfied.

In addition, from the Abbe number vd3p of the positive lens L16 of the third lens group 15 and the Abbe number vd3m of the meniscus lens L15 of the third lens group 15, $$vd3p-vd3m=56.22.$$

Thus, conditional expression (7) is satisfied.

Next, conditional expression (8) for telecentricity will be calculated. A permissible shift θ of tilting of the chief ray relative to the optical axis in this embodiment is $$0.4NA/(\beta \cdot n)=5.7 \text{ arcminute}$$

from conditional expression (8).

Here, the numerical aperture of the objective lens 2, NA=0.75, and the imaging magnification of the object image, β=20.

Figure 11:
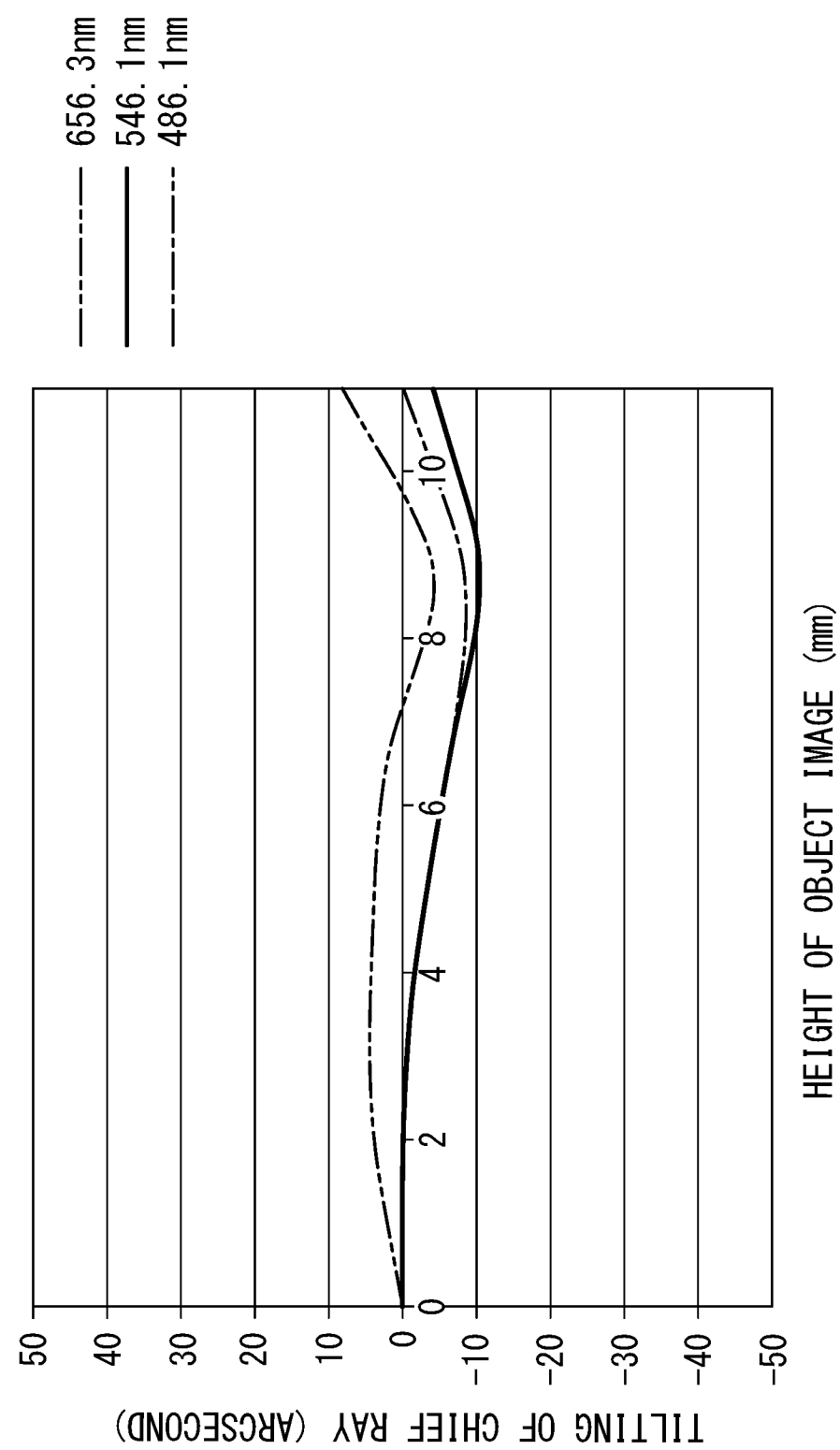
FIG. 11 is a diagram depicting the relationship of tilting of a chief ray with the height of the object image in the microscope imaging optical system in FIG. 7.

FIG. 11 shows tilting of the chief ray depending on the image height.

In this embodiment, because the angle shift of the chief ray relative to the optical axis is within 10 arcsecond over the entire image height, conditional expression (8) is satisfied and the light-field microscope apparatus 1 has sufficient performance for use as a light-field optical system.

In this example, superior telecentricity is also exhibited with wavelengths other than the dominant wavelength (λ=546.07 nm). If telecentricity is poor at a wavelength other than the dominant wavelength, the pupil image, from the wavelength other than the dominant wavelength, formed on the imaging element 11 shifts from the center of the region. This causes the following adverse effects.

(a) The image of the pupil intrudes on a pixel region of another color, producing color crosstalk.

(b) For a wavelength other than the dominant wavelength, the amount of light received at pixels in the periphery of the pixel region (9×9) covered by the color filter 16 is reduced. This results in color unevenness. For this reason, it is also preferable that superior image-side telecentricity be attained at the wavelengths other than the dominant wavelength.

In this example, the distance from the conjugate point of the pupil of the objective lens 2, i.e., the entrance pupil of the microscope imaging optical system 12, to the object image plane is 158.15 mm. Because the focal length of the image-forming lens is 180 mm, the length from the entrance pupil to the object image plane is about 0.88 times the focal length and is thus very short compared with conventional technique.

EXAMPLE 3

Example 3 of a microscope pupil imaging optical system 17 according to this embodiment will be describes below with reference to the drawings.

Figure 12:
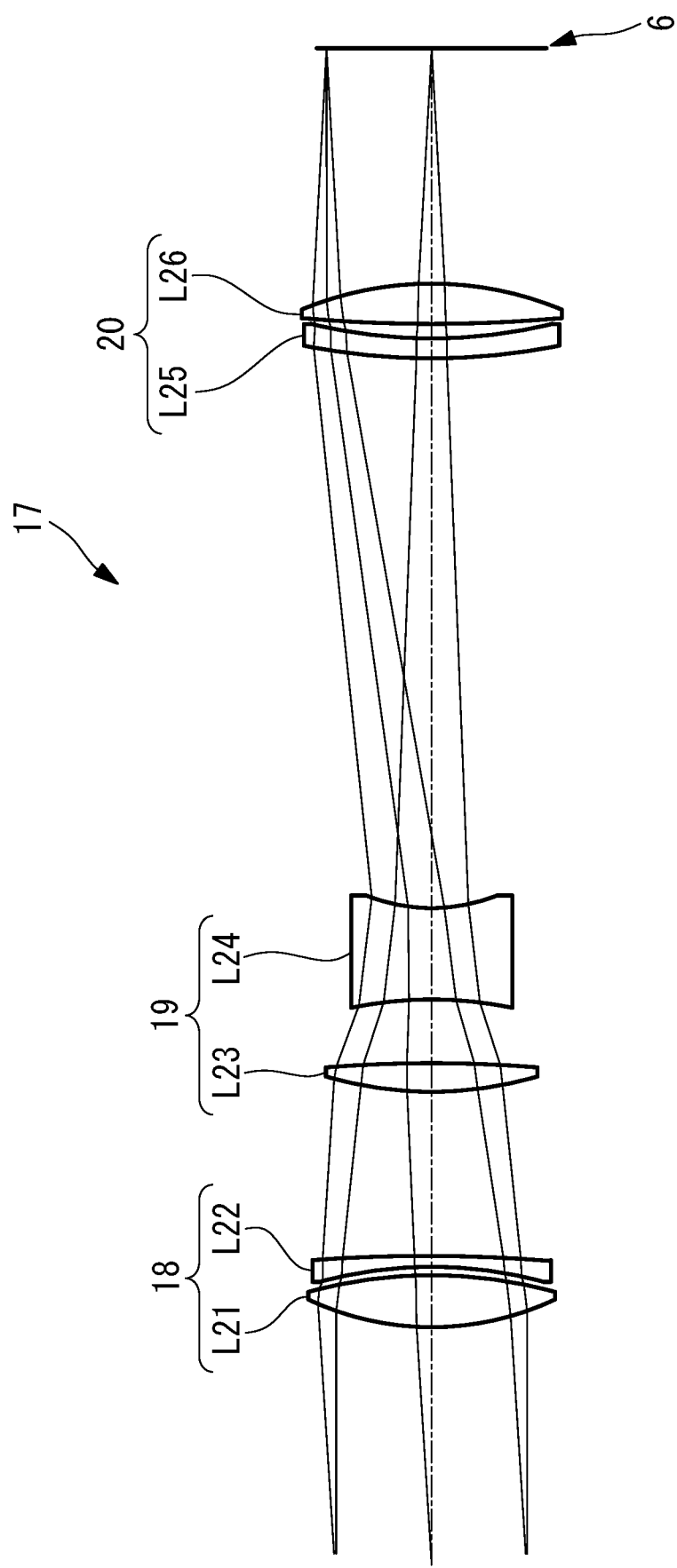
FIG. 12 is a longitudinal sectional view showing example 3 of the microscope imaging optical system provided in the light-field microscope apparatus in FIG. 1.
Figure 13:
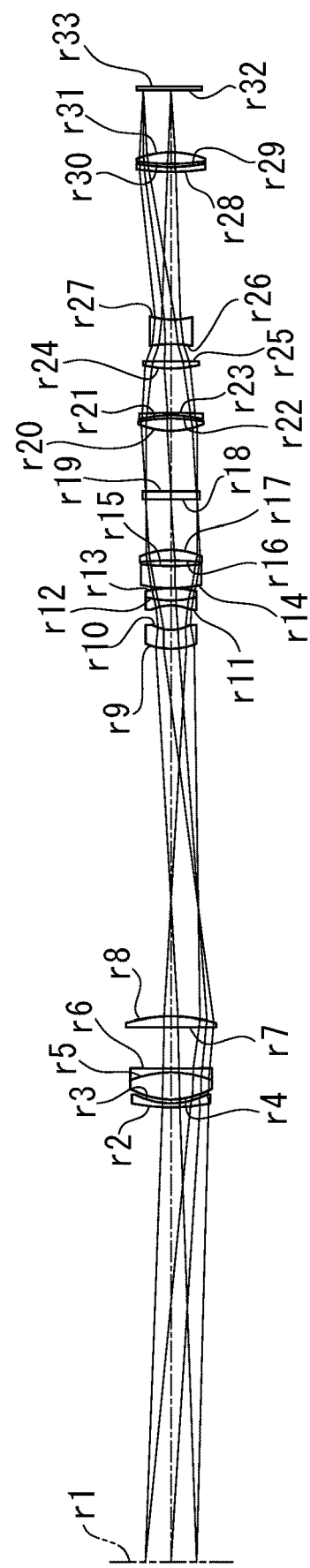
FIG. 13 is a longitudinal sectional view showing the arrangement of the microscope imaging optical system in FIG. 12, the pupil relay optical system, the pupil modulation optical element, and the microlens array.

FIG. 12 is the lens arrangement in the microscope imaging optical system 17 according to this example. FIG. 13 shows the arrangement of the pupil relay optical system 3, the pupil modulation optical element 5, the microscope imaging optical system 17, and the microlens array 6.

In this example, a light beam that comes from the object and that is collected by the finite-system microscope objective lens enters the pupil relay optical system 3 before an object image is formed.

Lens data of the optical system in FIG. 13 is shown below.

Figure 14A:
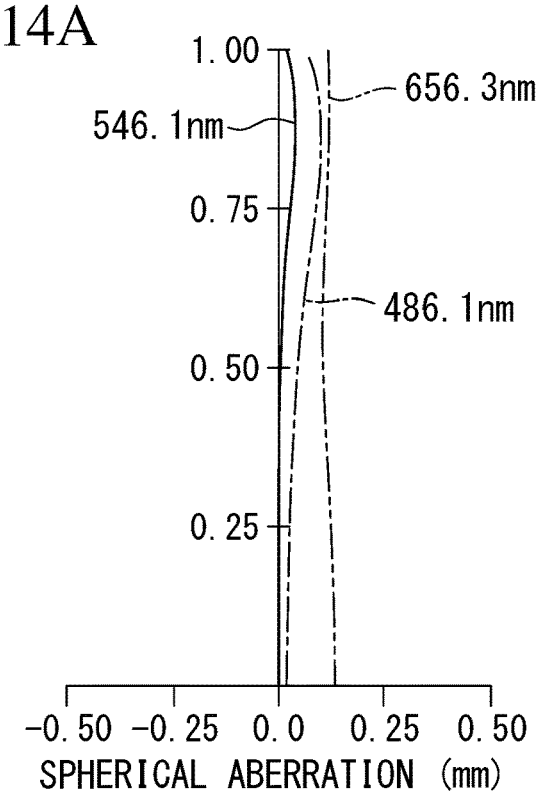
FIG. 14A is a diagram depicting spherical aberration of an object image with the optical system in FIG. 13.
Figure 14B:
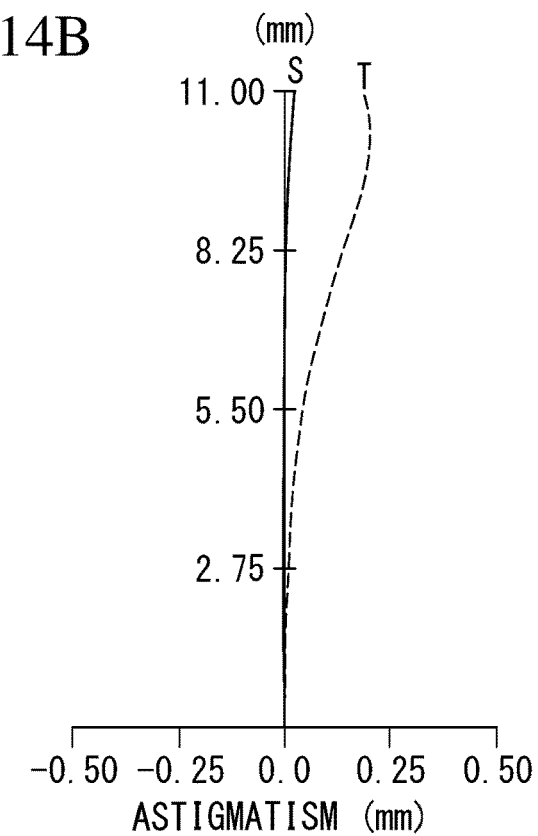
FIG. 14B is a diagram depicting astigmatism of an object image with the optical system in FIG. 13.
Figure 14C:
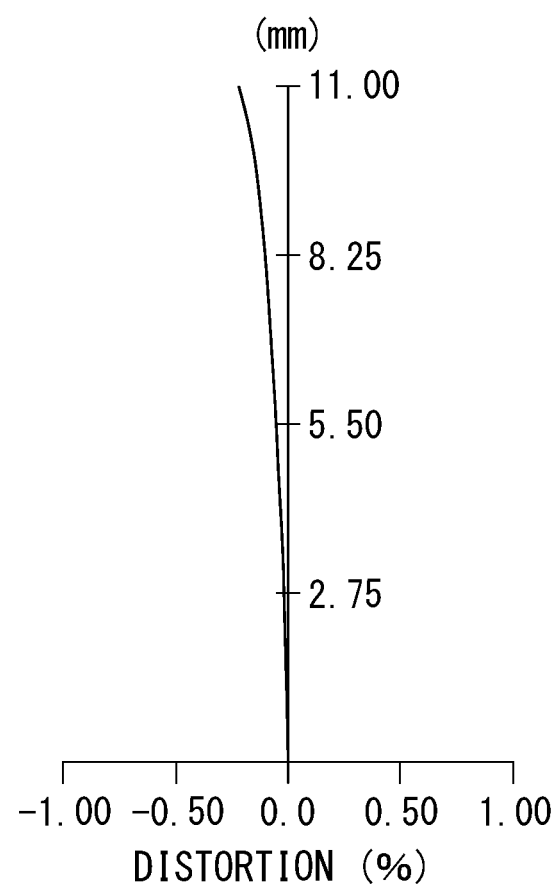
FIG. 14C is a diagram depicting distortion of an object image with the optical system in FIG. 13.

In addition, FIGS. 14A, 14B, and 14C show aberrations of the microscope imaging optical system 17 including the pupil relay optical system 3.

Here, the dominant wavelength is 546.07 nm, and the entrance pupil diameter is 20 mm.

| Surface No. | Radius of curvature r | Spacing d | nd | vd |
|---|---|---|---|---|
| 1 | ∞ | 180.0000 | | |
| 2 | 80.4555 | 1.5000 | 1.68893 | 31.08 |
| 3 | 28.8182 | 1.5068 | | |
| 4 | 30.2520 | 11.0000 | 1.49700 | 81.55 |
| 5 | −39.6658 | 1.5000 | 1.68893 | 31.08 |
| 6 | −92.8698 | 16.1241 | | |
| 7 | ∞ | 4.1981 | 1.80518 | 25.43 |
| 8 | −63.6352 | 145.3145 | | |
| 9 | 22.2340 | 7.3260 | 1.68893 | 31.08 |
| 10 | 17.7872 | 9.9872 | | |
| 11 | −21.0836 | 2.0759 | 1.80518 | 25.43 |
| 12 | 33.2378 | 4.4181 | 1.43875 | 94.95 |
| 13 | −33.2378 | 0.2000 | | |
| 14 | 51.6870 | 8.6584 | 1.43875 | 94.95 |
| 15 | 120.8585 | 2.1958 | | |
| 16 | −285.7757 | 3.9950 | 1.80518 | 25.43 |
| 17 | −31.4310 | 20.045689 | | |
| 18 | ∞ | 3.0000 | 1.51680 | 64.17 |
| 19 | ∞ | 24.0000 | | |
| 20 | 30.3365 | 5.2925 | 1.43875 | 94.95 |
| 21 | −48.3084 | 1.0000 | | |
| 22 | −45.8504 | 1.1000 | 1.84666 | 23.78 |
| 23 | −178.9643 | 17.3761 | | |
| 24 | 40.2259 | 2.9562 | 1.84666 | 23.78 |
| 25 | −139.6577 | 6.6802 | | |
| 26 | −48.0049 | 9.7053 | 1.83400 | 37.16 |
| 27 | 18.0268 | 58.1258 | | |
| 28 | 72.1377 | 2.0000 | 1.84666 | 23.78 |
| 29 | 57.2314 | 1.5107 | | |
| 30 | 147.9540 | 4.2531 | 1.43875 | 94.95 |
| 31 | −35.7853 | 24.9657 | | |
| 32 | 0.5502 | 0.8000 | 1.458 | 67.7 |
| 33 | ∞ | 0.6515 | | |
| 34 | ∞ | | | |

Surface No. 1 is the exit pupil of the objective lens 2, surface No. 2 to surface No. 17 are the pupil relay optical system 3, and the imaging magnification of the pupil is ×1.

The pupil of the objective lens 2 is formed by the pupil relay optical system 3 at the position of surface No. 18. In addition, surface No. 27 is also the position of the entrance pupil of the microscope imaging optical system 17 according to this embodiment.

Surface No. 18 and surface No. 19 are the pupil modulation optical element 5.

Surface No. 20 to surface No. 31 are the microscope imaging optical system 17, and the focal length is 180 mm. The image height is 11 mm.

Surface No. 32 and surface No. 33 are the microlens array 6.

The pitch of the microlens array 6 is 0.045 mm both in the longitudinal and lateral directions, and the size on a plane orthogonal to the optical axis is 17.6 mm×13.2 mm.

Surface No. 34 is the light-receiving surface of the imaging element 11. The pixel pitch of the imaging element 11 is 5 μm. More specifically, pixels in the number of 9 pixel×9 pixel=81 (n=9) correspond to each of the microlenses 10.

The focal length of each of the microlenses 10 of microlens array 6 is 1.2 mm.

As shown in FIGS. 10A and 10B, for 9×9 pixels corresponding to each of the microlenses 10, a color filter 16 of any one of R, G, and B is disposed on the imaging element 11. By doing so, a light field color image can be acquired.

A first lens group 18 of the microscope imaging optical system 17 according to this embodiment includes a biconvex lens L21 and a meniscus lens (negative lens) L22 that has a concave surface on the object side, in that order from the object side.

A second lens group 19 is a biconvex lens L23 and a biconcave lens L24.

In addition, a third lens group 20 is a negative meniscus lens L25 that has a concave surface on the image side and a biconvex lens (positive lens) L26. The Abbe number of the meniscus lens L25 is 23.78, and the Abbe number of the biconvex lens L26 is 94.95.

The spacing dp1 between the biconvex lens L21, closest to the object, of the first lens group 18 and the entrance pupil is $dp1=d18+d19=27$ mm, and therefore, $dp1/f=0.15$.

Thus, conditional expression (1) is satisfied.

In addition, the distance TT from the entrance pupil to the object image plane formed by the microscope imaging optical system 17 is $TT=161.97$ mm, and therefore, $TT/f=0.8998$.

Thus, conditional expression (2) is satisfied.

In addition, the focal length fG1 of the first lens group 18, the focal length fG2 of the second lens group 19, and the focal length fG3 of the third lens group 20 are $fG1=97.17$ mm, $fG2=-50.57$ mm, and $fG3=81.71$ mm, respectively, and therefore, $fG1/f=0.54$, $fG2/f=-0.28$, and $fG3/f=0.45$.

Thus, conditional expressions (3), (4), and (5) are satisfied.

In addition, from the Abbe number vd1cx of the biconvex lens L21 of the first lens group 18 and the Abbe number vd1cv of the meniscus lens L22 of the first lens group 18, $vd1cx-vd1cv=71.17$.

Thus, conditional expression (6) is satisfied.

In addition, from the Abbe number vd3p of the positive lens L26 of the third lens group 20 and the Abbe number vd3m of the meniscus lens L25 of the third lens group 20, $vd3p-vd3m=71.17$.

Thus, conditional expression (7) is satisfied.

Next, the conditional expression for telecentricity will be calculated. A permissible shift θ of tilting of the chief ray relative to the optical axis in this embodiment is $$0.4NA/(\beta \cdot n) = 5.7 \text{ arcminute}$$

from conditional expression (8).

Here, the numerical aperture of the objective lens 2, NA=0.75, and the imaging magnification of the object image, β=20.

Figure 15:
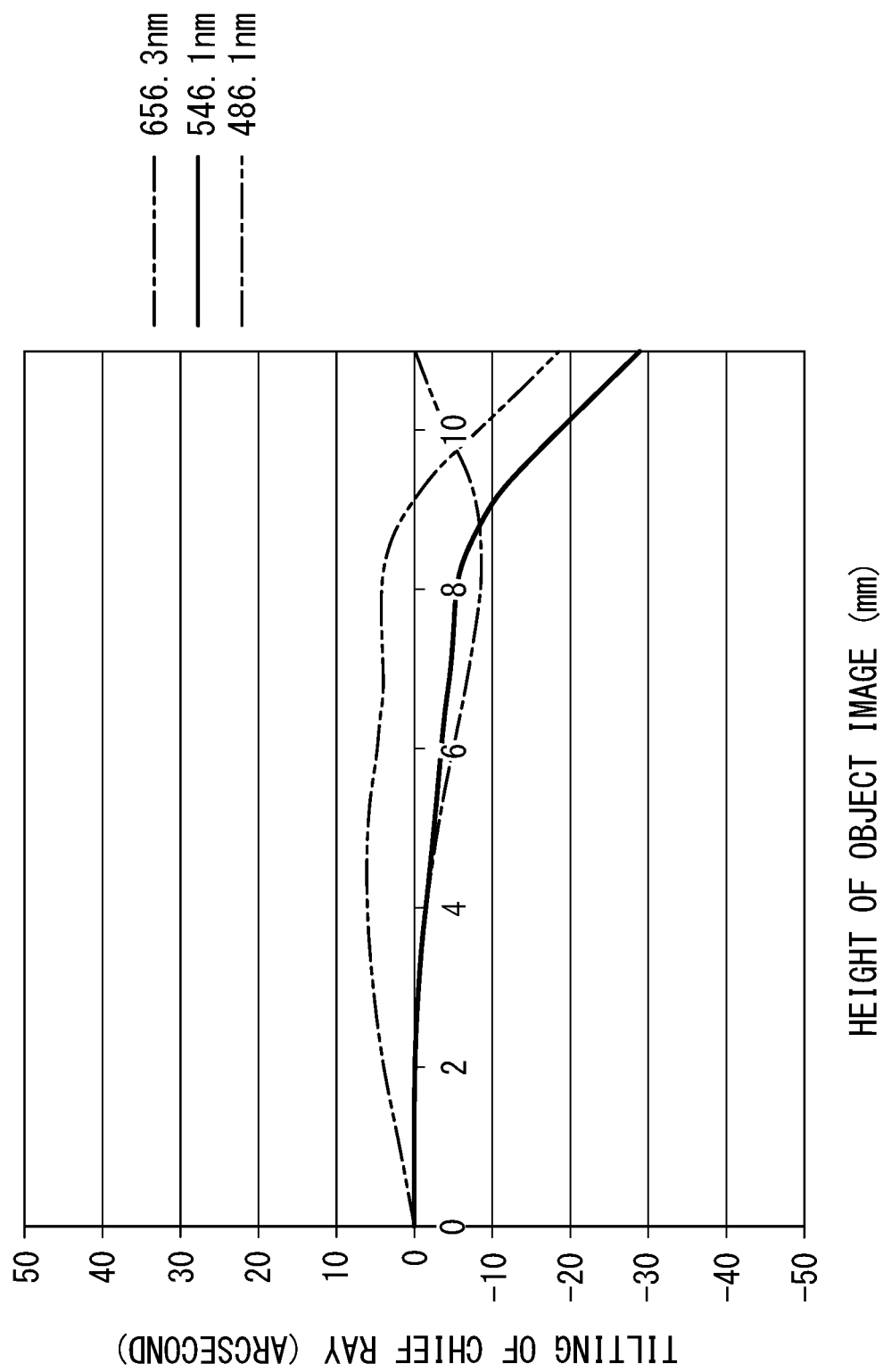
FIG. 15 is a diagram depicting the relationship of tilting of a chief ray with the height of the object image in the microscope imaging optical system in FIG. 12.

FIG. 15 shows tilting of the chief ray depending on the image height.

In this embodiment, because the angle shift of the chief ray (at each of the wavelengths used) relative to the optical axis is within 29 arcsecond over the entire image height, conditional expression (8) is satisfied, and the light-field microscope apparatus 1 has sufficient performance for use as a light-field optical system.

EXAMPLE 4

Example 4 of a microscope imaging optical system 21 according to this embodiment will be described below with reference to the drawings. The configuration in this example is the same as that in example 3.

Figure 16:
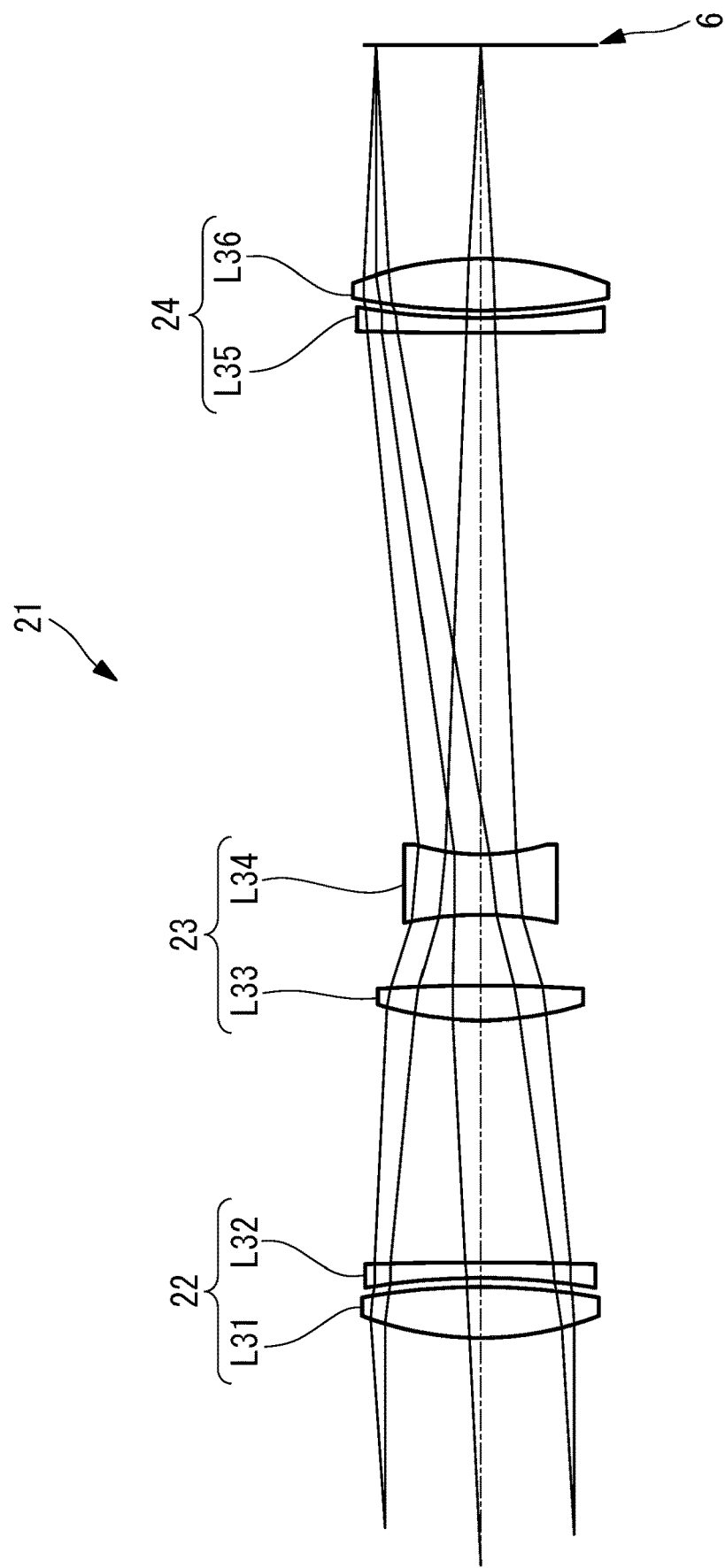
FIG. 16 is a longitudinal sectional view showing example 4 of the microscope imaging optical system provided in the light-field microscope apparatus in FIG. 1.
Figure 17:
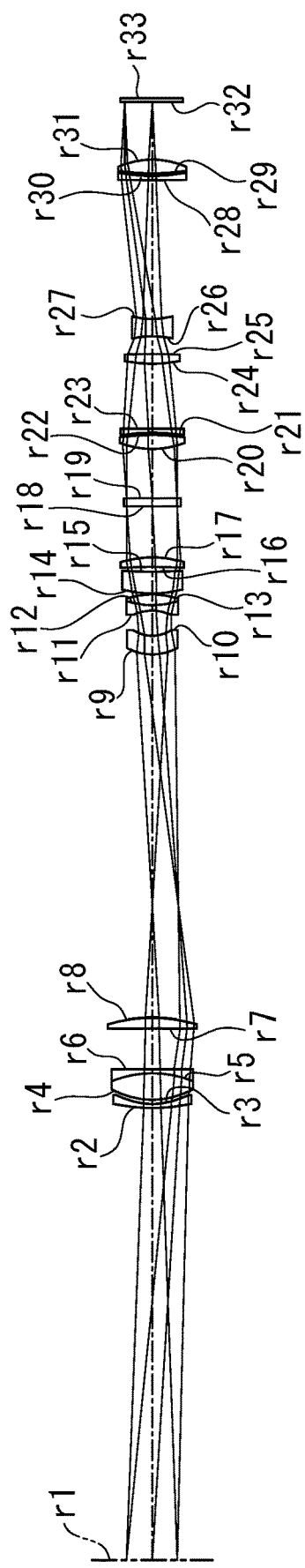
FIG. 17 is a longitudinal sectional view showing the arrangement of the microscope imaging optical system in FIG. 16, the pupil relay optical system, the pupil modulation optical element, and the microlens array.

FIG. 16 shows the lens arrangement of the microscope imaging optical system 21 according to this example. FIG. 17 shows the arrangement of the pupil relay optical system 3, the pupil modulation optical element 5, the microscope imaging optical system 21, and the microlens array 6.

Lens data of the optical system in FIG. 17 is shown below.

Figure 18A:
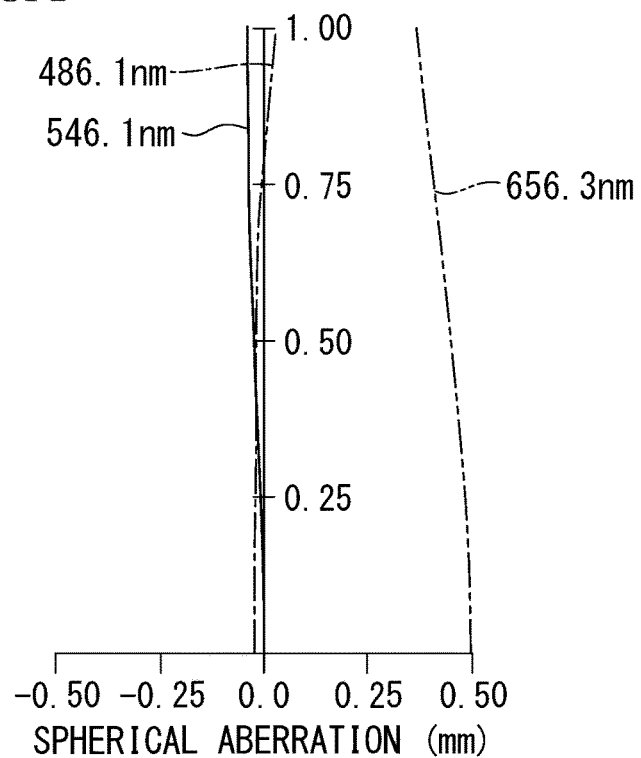
FIG. 18A is a diagram depicting spherical aberration of an object image with the optical system in FIG. 17.
Figure 18B:
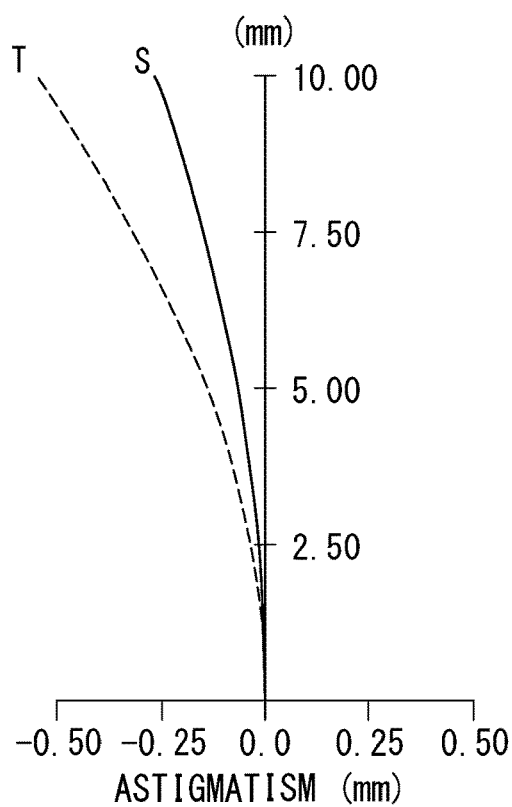
FIG. 18B is a diagram depicting astigmatism of an object image with the optical system in FIG. 17.
Figure 18C:
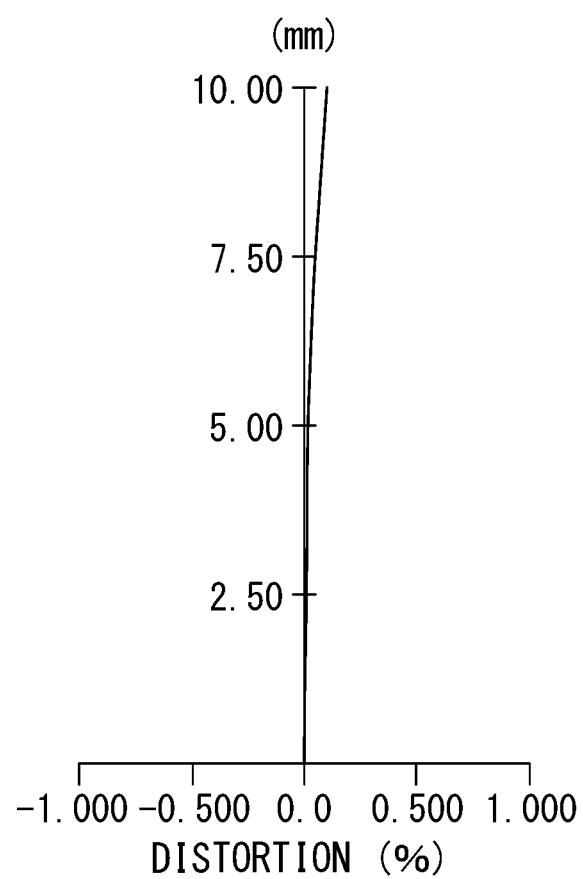
FIG. 18C is a diagram depicting distortion of an object image with the optical system in FIG. 17.

In addition, FIGS. 18A, 18B, and 18C show aberrations of the microscope imaging optical system 21 including the pupil relay optical system 3.

| Surface No. | Radius of curvature r | Spacing d | nd | vd |
|---|---|---|---|---|
| 1 | ∞ | 180.0000 | | |
| 2 | 80.4555 | 1.5000 | 1.68893 | 31.08 |
| 3 | 28.8182 | 1.5068 | | |
| 4 | 30.2520 | 11.0000 | 1.49700 | 81.55 |
| 5 | −39.6658 | 1.5000 | 1.68893 | 31.08 |
| 6 | −92.8698 | 16.1241 | | |
| 7 | ∞ | 4.1981 | 1.80518 | 25.43 |
| 8 | −63.6352 | 145.3145 | | |
| 9 | 22.2340 | 7.3260 | 1.68893 | 31.08 |
| 10 | 17.7872 | 9.9872 | | |
| 11 | −21.0836 | 2.0759 | 1.80518 | 25.43 |
| 12 | 33.2378 | 4.4181 | 1.43875 | 94.95 |
| 13 | −33.2378 | 0.2000 | | |
| 14 | 51.6870 | 8.6584 | 1.43875 | 94.95 |
| 15 | 120.8585 | 2.1958 | | |
| 16 | −285.7757 | 3.9950 | 1.80518 | 25.43 |
| 17 | −31.4310 | 19.9086 | | |
| 18 | ∞ | 3.0000 | 1.51680 | 64.17 |
| 19 | ∞ | 20.0000 | | |
| 20 | 33.3806 | 5.4531 | 1.43875 | 94.95 |
| 21 | −66.9568 | 1.0000 | | |
| 22 | −60.3378 | 1.5000 | 1.80518 | 25.43 |
| 23 | −359.5391 | 25.9105 | | |
| 24 | 38.4412 | 3.7794 | 1.80518 | 25.43 |
| 25 | −147.7047 | 7.3596 | | |
| 26 | −42.4458 | 6.5083 | 1.80100 | 34.97 |
| 27 | 20.7242 | 55.7455 | | |
| 28 | 369.2142 | 1.5000 | 1.68893 | 31.08 |
| 29 | 61.4652 | 1.0000 | | |
| 30 | 69.8342 | 5.2436 | 1.51633 | 64.14 |
| 31 | −37.6881 | 22.8824 | | |
| 32 | 0.5502 | 0.8000 | 1.458 | 67.7 |
| 33 | ∞ | 0.6515 | | |
| 34 | ∞ | | | |

The spacing dp1 between a biconvex lens L31, closest to the object, of a first lens group 22 and the entrance pupil is $$dp1 = d18 + d19 = 23 \text{ mm},$$

and therefore, $$dp1/f = 0.128.$$

Thus, conditional expression (1) is satisfied.

In addition, the distance TT from the entrance pupil to the object image plane formed by the microscope imaging optical system 21 is $$TT = 161 \text{ mm},$$

and therefore, $$TT/f = 0.894.$$

Thus, conditional expression (2) is satisfied.

In addition, the focal length fG1 of the first lens group 22, the focal length fG2 of a second lens group 23, and the focal length fG3 of a third lens group 24 are $$fG1 = 111.42 \text{ mm},$$

$$fG2 = -62.36 \text{ mm, and}$$

$$fG3 = 83.11 \text{ mm, respectively,}$$

and therefore, $$fG1/f = 0.619,$$

$$fG2/f = -0.346, \text{ and}$$

$$fG3/f = 0.46.$$

Thus, conditional expressions (3), (4), and (5) are satisfied.

In addition, from the Abbe number vd1cx of the biconvex lens L31 of the first lens group 22 and the Abbe number vd1cv of a negative lens L32 of the first lens group 22, $$vd1cx - vd1cv = 69.52.$$

Thus, conditional expression (6) is satisfied.

In addition, from the Abbe number vd3p of a positive lens L36 of the third lens group 24 and the Abbe number vd3m of a meniscus lens L35 of the third lens group 24, $$vd3p - vd3m = 33.06.$$

Thus, conditional expression (7) is satisfied.

Next, the conditional expression for telecentricity will be calculated. A permissible shift θ of tilting of the chief ray relative to the optical axis in this embodiment is $$0.4NA/(\beta \cdot n) = 5.7 \text{ arcminute}$$

from conditional expression (8).

Here, the numerical aperture of the objective lens 2, NA=0.75, and the imaging magnification of the object image, β=20.

Figure 19:
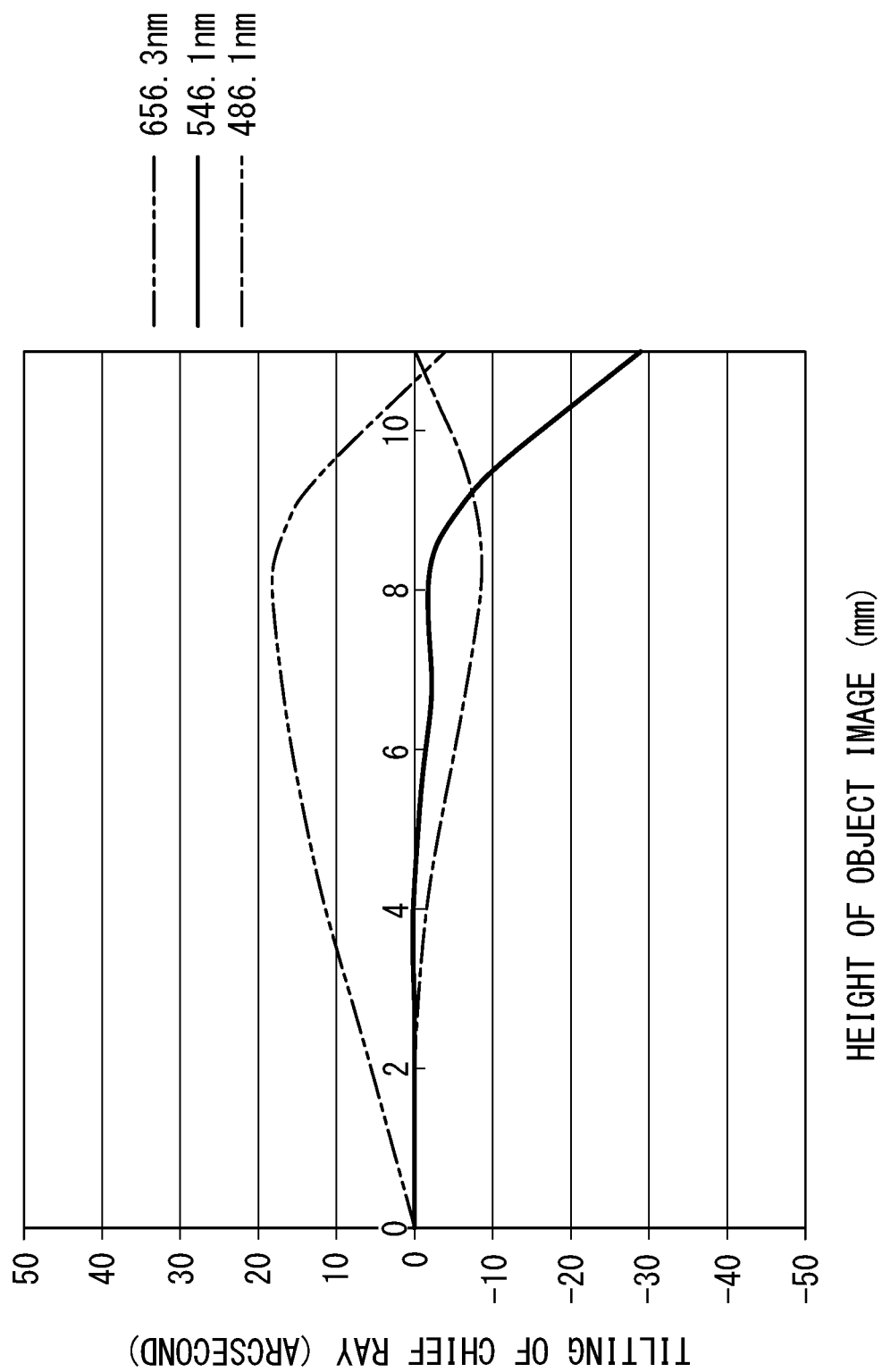
FIG. 19 is a diagram depicting the relationship of tilting of a chief ray with the height of the object image in the microscope imaging optical system in FIG. 16.

FIG. 19 shows tilting of the chief ray depending on the image height.

In this embodiment, because the angle shift of the chief ray (at each of the wavelengths used) relative to the optical axis is within 29 arcsecond over the entire image height, conditional expression (8) is satisfied, and the light-field microscope apparatus 1 has sufficient performance for use as a light-field optical system.

Table 1 shows numerical values in conditional expression (1) to conditional expression (8) in example 1 to example 4.

TABLE 1

| | | Example numbers | | | |
|---|---|---|---|---|---|
| Conditional expressions | Values | 1 | 2 | 3 | 4 |
| (1) 0.05 < dp1/f < 0.15 | dp1/f | 0.067 | 0.096 | 0.15 | 0.128 |
| (2) TT/f < 0.9 | TT/f | 0.847 | 0.879 | 0.8998 | 0.894 |
| (3) 0.2 < fG3/f < 0.45 | fG3/f | 0.21 | 0.41 | 0.45 | 0.46 |
| (4) 0.55 < fG1 < 0.73 | fG1/f | 0.59 | 0.7 | 0.54 | 0.619 |
| (5) −0.37 < fG2/f < −0.11 | fG2/f | −0.12 | −0.35 | −0.28 | −0.346 |
| (6) vd1cx − vd1cv > 50 | vd1cx − vd1cv | 56.22 | 56.22 | 71.17 | 69.52 |
| (7) vd3p − vd3m > 50 | vd3p − vd3m | Not applicable | 56.22 | 71.17 | 33.06 |
| (8) $0 < \theta < |0.4NA/(\beta n)|$ | $\theta, |0.4NA/(\beta n)|$ | 6.2 sec., 3.4 min. | 10 sec., 5.7 min. | 10 sec., 5.7 min. | 29 sec., 5.7 min |

As a result, the following aspect is read by the above described embodiment of the present invention.

One aspect of the present invention is a microscope imaging optical system having an entrance pupil on an object side, the microscope imaging optical system including, in order from the object side: a first lens group that has positive refractive power and that includes a biconvex lens and a negative lens having a concave surface on the object side; a second lens group that has negative refracting power and that includes a negative lens having a concave surface on the object side; and a third lens group that has positive refractive power and that includes a meniscus lens and a positive lens having a convex surface on the image side, wherein the microscope imaging optical system satisfies conditional expressions (1) and (2)

$$0.05 < dp1/f < 0.15 \quad (1) \text{ and}$$

$$0.5 < TT/f < 0.9 \quad (2),$$

where dp1 is a spacing between the lens that belongs to the first lens group and that is closest to the object side and the entrance pupil, f is a focal length of the microscope imaging optical system, and TT is a distance from the entrance pupil to an object image plane formed by the microscope imaging optical system.

If the lower limit of conditional expression (1) is exceeded, the pupil modulation optical element disposed on the entrance pupil plane is too close to the first lens group, making disposition thereof difficult. In contrast, if the upper limit of conditional expression (1) is exceeded, the distance from the entrance pupil to the first lens group is large, resulting in too large a distance from the entrance pupil to the image plane. In addition, if the upper limit of conditional expression (2) is exceeded, the distance from the entrance pupil to the image plane is large, resulting in an increase in the size of the entire optical system.

In the above-described aspect, the microscope imaging optical system may satisfy conditional expression (3)

$$0.2 < fG3/f < 0.5 \quad (3),$$

where fG3 is a focal length of the third lens group.

If the lower limit of conditional expression (3) is exceeded, the refractive power of the third lens group is too high, deteriorating the spherical aberration, comatic aberration, and distortion of the object image. On the other hand, if the upper limit of conditional expression (3) is exceeded, the refractive power of the third lens group becomes low and the power for deflecting a light ray is insufficient, making it impossible to maintain the image-side telecentricity.

In addition, in the above-described aspect, the microscope imaging optical system may satisfy conditional expressions (4) and (5)

$$0.5 < fG1 < 0.8 \quad (4) \text{ and}$$

$$-0.4 < fG2 < -0.1 \quad (5),$$

where fG1 is a focal length of the first lens group, and fG2 is a focal length of the second lens group.

If the lower limit of conditional expression (4) is exceeded, the refractive power of the first lens group is too high, deteriorating the spherical aberration and comatic aberration of the object image. If the upper limit of conditional expression (4) is exceeded, the refractive power is too low, making it impossible to achieve a specified focal length.

In addition, if the lower limit of conditional expression (5) is exceeded, the refractive power of the second lens group is too low and the Petzval sum becomes large, making it impossible to correct field curvature. If the upper limit of conditional expression (5) is exceeded, the refractive power is too high, deteriorating the spherical aberration and comatic aberration of the object image.

In addition, in the above-described aspect, the microscope imaging optical system may satisfy conditional expression (6)

$$vd1cx - vd1cv > 50 \quad (6),$$

where vd1cx is an Abbe number of the biconvex lens of the first lens group, and vd1cv is an Abbe number of the negative lens of the first lens group.

If the range of conditional expression (6) is not satisfied, the axial chromatic aberration and the chromatic aberration of magnification of the object image deteriorate, deteriorating the imaging performance.

In addition, in the above-described aspect, the microscope imaging optical system may satisfy conditional expression (7)

$$vd3p - vd3m > 33 \quad (7),$$

where vd3p is an Abbe number of the positive lens of the third lens group, and vd3m is an Abbe number of the meniscus lens of the third lens group.

In addition, if the range of conditional expression (7) is not satisfied, the image-side telecentricity with wavelengths other than the dominant wavelength deteriorates, causing a shift due to color of the pupil image formed by a microlens.

In addition, another aspect of the present invention is a light-field microscope including: an objective lens that is configured to collect light from an object; the above-described microscope imaging optical system that is configured to form an object image by focusing the light collected by the objective lens; a microlens array having a plurality of microlenses arranged on the object image plane formed by the microscope imaging optical system; and an imaging element having a light-receiving surface on which an image of the entrance pupil is formed by each of the microlenses.

In the above-described aspect, the light-field microscope may satisfy conditional expression (8)

$$0 < \theta \leq |0.4 NA/(\beta \cdot n)| \quad (8),$$

where β is an imaging magnification of the object image formed on the microlens array, NA is a numerical aperture of the objective lens, p is a pitch of the imaging element, n is the square root of the number of pixels included in one picture element, and θ is tilting of a chief ray exiting the microscope imaging optical system relative to an optical axis.

REFERENCE SIGNS LIST

1 Light-field microscope
2 Objective lens
3 Pupil relay optical system
4, 12, 17, 21 Microscope imaging optical system
6 Microlens array
7, 13, 18, 22 First lens group
8, 14, 19, 23 Second lens group
9, 15, 20, 24 Third lens group
10 Microlens
11 Imaging element
L3, L11, L21, L31 Biconvex lens
L4 Biconcave lens (negative lens)
L6, L15, L25, L35 Meniscus lens
L7 Planoconvex lens (positive lens)
L12, L22 Meniscus lens (negative lens)
L16, L26 Biconvex lens (positive lens)
L32 Negative Lens
L36 Positive lens

The invention claimed is:

1. A microscope imaging optical system having an entrance pupil on an object side, the microscope imaging optical system comprising, in order from the object side:
    a first lens group that has positive refractive power and that includes a biconvex lens and a negative lens having a concave surface on the object side;
    a second lens group that has negative refracting power and that includes a negative lens having a concave surface on the object side; and
    a third lens group that has positive refractive power and that includes a meniscus lens and a positive lens having a convex surface on an image side,
    wherein the microscope imaging optical system satisfies conditional expressions (1) and (2)

$$0.05 < dp1/f < 0.15 \quad (1) \text{ and}$$

$$0.5 < TT/f < 0.9 \quad (2),$$

where dp1 is a spacing between a lens that belongs to the first lens group and that is closest to the object side and the entrance pupil,
f is a focal length of the microscope imaging optical system, and
TT is a distance from the entrance pupil to an object image plane formed by the microscope imaging optical system.

2. The microscope imaging optical system according to claim 1, wherein the microscope imaging optical system satisfies conditional expression (3)

$$0.2 < fG3/f < 0.5 \quad (3),$$

where fG3 is a focal length of the third lens group.

3. The microscope imaging optical system according to claim 2, wherein the microscope imaging optical system satisfies conditional expressions (4) and (5)

$$0.5 < fG1 < 0.8 \quad (4) \text{ and}$$

$$-0.4 < fG2 < -0.1 \quad (5),$$

where fG1 is a focal length of the first lens group, and fG2 is a focal length of the second lens group.

4. The microscope imaging optical system according to claim 2, wherein the microscope imaging optical system satisfies conditional expression (6)

$$vd1cx - vd1cv > 50 \quad (6),$$

where vd1cx is an Abbe number of the biconvex lens of the first lens group, and
vd1cv is an Abbe number of the negative lens of the first lens group.

5. The microscope imaging optical system according to claim 3, wherein the microscope imaging optical system satisfies conditional expression (7)

$$vd3p - vd3m > 33 \quad (7),$$

where vd3p is an Abbe number of the positive lens of the third lens group, and
vd3m is an Abbe number of the meniscus lens of the third lens group.

6. A light-field microscope comprising:
    an objective lens that is configured to collect light from an object;
    the microscope imaging optical system according to claim 2 that is configured to form an object image by focusing the light collected by the objective lens;
    a microlens array having a plurality of microlenses arranged on the object image plane formed by the microscope imaging optical system; and
    an imaging element having a light-receiving surface on which an image of the entrance pupil is formed by each of the microlenses.

7. The light-field microscope according to claim 6, wherein the light-field microscope satisfies conditional expression (8)

$$0 < \theta \leq |0.4 NA/(\beta \cdot n)| \quad (8),$$

where β is an imaging magnification of the object image formed on the microlens array,
NA is a numerical aperture of the objective lens,
p is a pitch of the imaging element,
n is the square root of the number of pixels included in one picture element, and
θ is tilting of a chief ray exiting the microscope imaging optical system relative to an optical axis.

* * * * *